United States Patent
Tinnakornsrisuphap et al.

(10) Patent No.: US 8,665,768 B2
(45) Date of Patent: Mar. 4, 2014

(54) FEMTOCELL ONE-TO-MANY PACKET DELIVERY

(75) Inventors: Peerapol Tinnakornsrisuphap, San Diego, CA (US); Peter Hans Rauber, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 12/891,499

(22) Filed: Sep. 27, 2010

(65) Prior Publication Data

US 2011/0243053 A1 Oct. 6, 2011

Related U.S. Application Data

(60) Provisional application No. 61/299,840, filed on Jan. 29, 2010, provisional application No. 61/314,068, filed on Mar. 15, 2010.

(51) Int. Cl.
*H04H 20/71* (2008.01)
(52) U.S. Cl.
USPC .......................................................... 370/312
(58) Field of Classification Search
None
See application file for complete search history.

(56) References Cited

U.S. PATENT DOCUMENTS

| | | | |
|---|---|---|---|
| 2003/0026240 A1 | 2/2003 | Eyuboglu et al. | |
| 2005/0226202 A1* | 10/2005 | Zhang et al. | 370/349 |
| 2008/0151814 A1 | 6/2008 | Jokela | |
| 2010/0227611 A1 | 9/2010 | Schmidt et al. | |
| 2011/0044225 A1* | 2/2011 | Rinne et al. | 370/312 |
| 2011/0235563 A1 | 9/2011 | Tinnakornsrisuphap et al. | |
| 2013/0010698 A1 | 1/2013 | Periyalway et al. | |

FOREIGN PATENT DOCUMENTS

| | | |
|---|---|---|
| EP | 1684465 A1 | 7/2006 |
| EP | 2043404 A1 | 4/2009 |
| WO | WO03010900 A1 | 2/2003 |

OTHER PUBLICATIONS

3rd Generation Partnership Project Specification Group Services and System Aspects, Local IP Access and Selected IP Traffic Offload, (Release 10), 3GPP Draft 23829-031 LIPA SIPTO CM, 3rd Generation Partnership Project (3GPP) Mobile Competence Centre, 650, Route Des Lucioles, F-06921 Sophia-Antipolis Cedex, France, vol. SA WG2, No. Shenzhen. 20100118, Jan. 12, 2010, XP050432676, [retrieved on Jan. 12, 2010].
International Search Report and Written Opinion—PCT/US2011/023076, ISA/EPO—May 2, 2011.

(Continued)

*Primary Examiner* — Minh-Trang Nguyen

(57) ABSTRACT

Femto nodes provide Local IP Access (LIPA) which allows terminals to communicate with local area networks that the femtocells reside in using cellular air-interfaces (such as cdma2000, UMTS or LTE). Femto nodes also enable Remote IP Access (RIPA) service, which allows the terminals to access the local area network from the Internet as if they were present in the local area networks. Further, to avoid degradation of standby time of the terminals or the capacity of the femto node, or both, apparatus and methods are described herein in which a femto node consolidates received Broadcast/Multicast IP packets from a local area network prior to delivering the packets to terminals over a cellular air-interface. In other aspects, a femto node may deliver the received Broadcast/Multicast IP packets via a cellular one-to-many transmission, either with or without consolidation.

51 Claims, 18 Drawing Sheets

(56) References Cited

OTHER PUBLICATIONS

NEC. "Discussion on requirements for digital content sharing with LIPA", 3GPP Draft, S1-094015, 3rd Generation Partnership Project (3GPP), Mobile Competence Centre, 650, Route Des Lucioles, F-06921 Sophia-Antipolis Cedex, France. No. Beijing. 20091116, Nov. 16, 2009, XP050395999, [retrived on Nov. 9, 2009].

Qualcomm Incorporated: "Impacts of multicast support for service discovery in supporting LIPA", 3GPP Draft, S2-100081, 3rd Generation Partnership Project (3GPP). Mobile Competence Centre, 650, Route Des Lucioles. F-06921 Sophia-Antipolis Cedex, France. vol. SA WG2, No. Shenzhen. 20100118 Jan. 12, 2010, XP050432710, [retrieved on Jan. 12, 2010].

Samsung: "Open issues and solution for LIPA service" 3GPP Draft, S2-094346-Open-Issues-LIPA; 3rd Generation Partnership Project (3GPP), Mobile Competence Centre, 650, Route Des Lucioles, F-06921 Sophia Antipolis Cedex, France, No. Sophia, 20090630, Jun. 30, 2009, XP050355875, [retrieved on Jun. 30, 2009].

* cited by examiner

FEMTOCELL ONE-TO-MANY PACKET DELIVERY

CLAIM OF PRIORITY UNDER 35 U.S.C. §119

The present Application for patent claims priority to Provisional Application No. 61/299,840 entitled "Method and Apparatus for Efficient Delivery of Broadcast IP Packets for Femtocell Local IP Access and Remote IP Access" filed Jan. 29, 2010, and assigned to the assignee hereof and hereby expressly incorporated by reference herein. In addition, the present application for patent claims priority to Provisional Application No. 61/314,068 entitled "FEMTOCELL ONE-TO-MANY PACKET DELIVERY" filed Mar. 15, 2010, and assigned to the assignee hereof and hereby expressly incorporated by reference herein.

CROSS-REFERENCE TO RELATED APPLICATIONS

The present application for patent is related to the following co-pending U.S. patent applications:

U.S. patent application Ser. No. 12/891,528, entitled "Femtocell One-To-Many Packet Delivery," filed concurrently herewith, assigned to the assignee hereof, and expressly incorporated by reference herein; and

BACKGROUND

1. Field

The present disclosure relates generally to wireless communication, and more specifically to local and remote Internet Protocol (IP) access via a femto access point or node.

2. Background

In order to extend the coverage area of macro base stations or to provide less expensive wireless communication services, a class of small base stations has been deployed. These access point (AP) base stations can be referred to as femto APs, femto nodes, Home Node B (HNB) units, Home evolved Node B (HeNB) units, femto Base Station (fBS), base station, Base Station Transceiver System (BSTS), etc., which are hereinafter referred to collectively or individually as "femto nodes". Often these femto nodes utilize a low power, unlicensed bandwidth for installing in a private residence or place of employment to provide indoor wireless communication service. Typically, the femto node is connected to the Internet and the mobile operator's network via a Digital Subscriber Line (DSL), cable Internet access, T1/T3, or the like, and offers typical base station functionality, such as Base Transceiver Station (BTS) technology, radio network controller, and gateway support node services. This allows an Access Terminal (AT), also referred to as a terminal, a cellular/mobile device, a handset, or User Equipment (UE), to connect to wireless services via the femto node as an alternative to using a wireless wide area or cellular network service provided by the macro base station.

Additionally, a terminal may utilize services of a Wireless Local Access Network (WLAN), such as but not limited to a WLAN compliant with IEEE 802.11 standards. For example, a wireless mobile device can be used in what are commonly referred to as "Wi-Fi hotspots" to access Internet services. Often, local hosts within a coverage area of a WLAN can provide local Internet Protocol (IP) services, such as providing access to a desktop personal computer, printer, media server, file server, etc.

In some aspects, a femto node can provide a service to a terminal called Local IP Access (LIPA). LIPA allows the terminal to communicate, using cellular air-interfaces (such as cdma2000, UMTS, or LTE), with a local area network in which the femto node resides. Another complimentary service that a femto node may also enable is Remote IP Access (RIPA). RIPA allows a terminal to have IP connectivity with a local area network in which the femto node resides even when the terminal is not connected over-the-air with the femto node. These two services allow a user to access a home local access network from anywhere using a cellular terminal.

In a typical local area network, one-to-many Internet Protocol (IP) packets are used when a host wants to discover a service, such as a media server or a printer, provided by another host on the same LAN. Similarly, one-to-many IP packets are also used by a host that wants to advertise a service that it can provide in the LAN. Both Ethernet and WiFi (802.11) have built-in mechanisms that deal with one-to-many IP packets effectively. In the current cellular air-interface protocols, however, one-to-many IP packets are rarely used.

Conventionally, using cellular air-interface protocols, one-to-many IP packets associated with a terminal receiving LIPA or RIPA services through a femto node have a number of detrimental effects on the terminal. For example, standby time of a battery powering the terminal is significantly reduced because of the one-to-many IP packets. Furthermore, the channel elements on the femto node are inefficiently utilized, thus reducing the number of terminals that the femto node can support.

For example, in order for a femto node to deliver a broadcast or multicast (i.e., one-to-many) IP packet associated with a LAN for LIPA or RIPA service, each terminal that connects with the femto node (either locally or remotely) needs to be paged, initiate a connection request, receive the packet and then maintain the traffic channel until a dormancy timer expires. Since the one-to-many IP packet associated with the LAN is typically very small (a few hundred bytes at most), the packet would be delivered in a few hundred milliseconds at the beginning of the connection for typical 3G/4G throughput. However, unlike WiFi, where the terminal receives a multicast packet and then goes back to sleep immediately, a cellular terminal will stay connected after the packet is delivered until the dormancy timer expires where the typical dormancy timer is set to 2-10 seconds.

To make the matter worse, the number of one-to-many IP packets in a LAN typically scale with the number of hosts that are connected in the LAN, e.g., in an Enterprise LAN with tens of Windows PCs, a one-to-many IP packet can be observed every second. With this frequency of one-to-many (broadcast/multicast) packets, the terminal may almost never drop the connection. This scenario leads to significant reduction in the standby time of the terminal, even without further user interaction with the terminal.

Thus, improvements in LIPA and RIPA service provided by a femto node to a terminal are desired in view of the current problems of poor standby time and lengthy maintaining of the traffic channel connection, which yields poor multiplexing gain on the limited channel elements of the femto node.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with optimizing delivery of one-to-many (broadcast/multicast) IP packets in femto nodes to address challenges that are not applicable to macro cellular networks. Delivery of one-to-many (e.g., broadcast or multicast) IP packets is consolidated without requiring changes to cellular air-interfaces or explicit support from access terminals. Thereby, a significant reduction is realized in time that the access terminal needs to stay connected because of the broadcast or multicast IP packets. The delivery of one or more packets from a local network can be delivered by a cellular communication, such as a cellular connection or utilizing a cellular one-to-many (broadcast/multicast) transmission (i.e., either locally or via an IP tunnel to a remote femto/macro base station).

In one aspect, a method is provided for consolidated delivery of one-to-many (e.g., broadcast/multicast) packets by a femto node by providing cellular air-interface service within a coverage area, communicating with an access terminal, receiving a plurality of one-to-many packets from a host via a local area network, buffering the plurality of one-to-many packets during a consolidation period, and delivering the plurality of one-to-many packets to the access terminal during a cellular communication.

In another aspect, at least one processor is provided for consolidated delivery of one-to-many (e.g., broadcast/multicast) packets by a femto node. A first module provides cellular air-interface service within a coverage area. A second module communicates with an access terminal. A third module receives a plurality of one-to-many packets from a host via a local area network. A fourth module buffers the plurality of one-to-many packets during a consolidation period. A fifth module delivers the plurality of one-to-many packets to the access terminal during a cellular communication.

In an additional aspect, a computer program product is provided for consolidated delivery of one-to-many (e.g., broadcast/multicast) packets by a femto node. A non-transitory computer-readable storage medium comprises a first set of codes for causing a computer to provide cellular air-interface service within a coverage area. A second set of codes causes the computer to communicate with an access terminal. A third set of codes causes the computer to receive a plurality of one-to-many packets from a host via a local area network. A fourth set of codes causes the computer to buffer the plurality of one-to-many packets during a consolidation period. A fifth set of codes causes the computer to deliver the plurality of one-to-many packets to the access terminal during a cellular communication.

In another additional aspect, an apparatus is provided for consolidated delivery of one-to-many (e.g., broadcast/multicast) packets by a femto node. The apparatus comprises means for providing cellular air-interface service within a coverage area. The apparatus comprises means for communicating with an access terminal. The apparatus comprises means for receiving a plurality of one-to-many packets from a host via a local area network. The apparatus comprises means for buffering the plurality of one-to-many packets during a consolidation period. The apparatus comprises means for delivering the plurality of one-to-many packets to the access terminal during a cellular communication.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The described aspects provide methods and apparatus for a femtocell to efficiently deliver one-to-many IP packets associated with a local access network, or, in other words, for a femtocell to efficiently provide Local IP Access (LIPA) and Remote IP Access (RIPA) services. Exemplary aspects presented herein include consolidation of one-to-many IP packets and use of a one-to-many air-interface to deliver the one-to-many IP packets, or use of a cellular one-to-many air-interface, or both. Specifically, a consolidation algorithm can be used to optimize the delivery of one-to-many IP packets over cellular air-interface, in some aspects providing improvements in standby battery time for a corresponding access terminal, and in some aspects providing improvements in usage of channel elements between the femtocell and the access terminal.

The described aspects address one or both of these considerations for LIPA service by consolidating the one-to-many packets, or by using a one-to-many (broadcast/multicast) air interface for delivery, or both.

Remote IP Access (RIPA) provides IP service to the AT as if the AT is currently connected to the local area network in which the femtocell resides. For example, an AT connecting through the RIPA service can receive identical services to a locally-connected AT. With the benefit of the present disclosure, it should be appreciated that the RIPA service can suffer from one-to-many packet problems similar to LIPA. In addition, it cannot be assumed that the femtocell has any control over how the tunneled RIPA packet is to be transmitted to the AT as the femtocell is not the base station that the AT connects to over-the-air.

With the benefit of the present disclosure, it should be appreciated that a home LIPA service can cause a problem of increased battery drain caused by one-to-many IP packets. In an Enterprise LIPA service, in addition to increased battery drain caused by the one-to-many packets, an overhead burden arises in that the femtocell needs to page and deliver the one-to-many packets in a unicast manner to each idle AT. In addition, poor multiplexing gain exists on usage of the limited channel elements in the femtocell. Similarly, a remote AT can experience increased battery drain when receiving RIPA service from a remote access node that delivers one-to-many packets by cellular connection on behalf of the home femto node.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
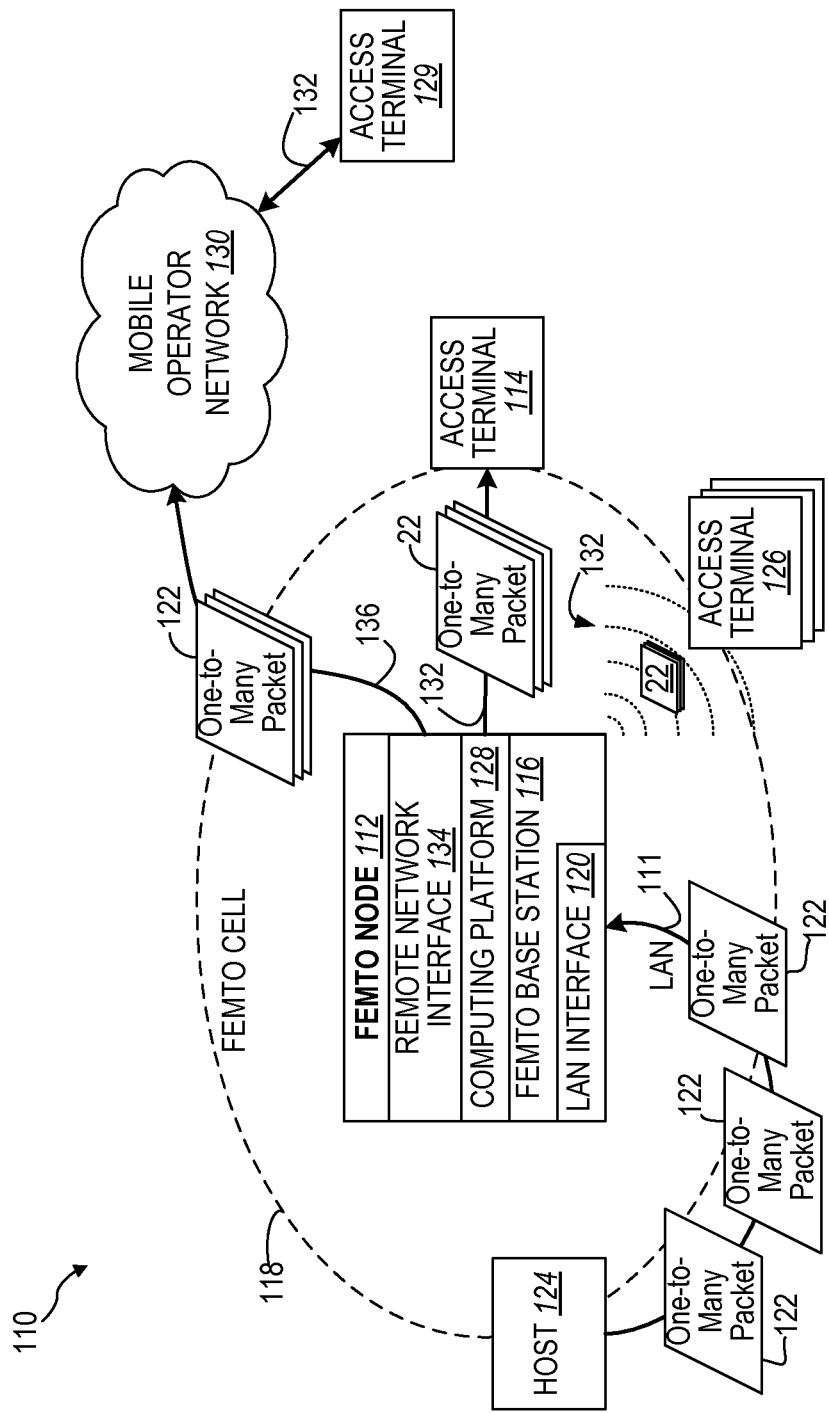
FIG. 1 is a schematic diagram of a wireless communication system that consolidates delivery of one-to-many packets from a local access network (LAN) via a femto node to an access terminal to enhance battery service life at the access terminal and to free-up cellular resources.

In FIG. 1, in an aspect, a wireless communication system 110 consolidates delivery of one-to-many packets from a local access network (LAN) 111 via a femto node 112 to an access terminal 114 to enhance battery service life at the access terminal 114 and to free up cellular resources. The femto node 112 comprises a femto base station 116 that provides cellular air-interface service within a coverage area (femtocell) 118. A local area network (LAN) interface (e.g., wired, wireless) 120 receives a plurality of one-to-many (broadcast or multicast) IP packets 122 from a host 124 via the LAN 111. The femto base station 116 establishes a cellular air-interface communication 132 with the access terminal 114 and delivers the one-to-many packets 122.

In particular, in an aspect, a computing platform 128 buffers the plurality of one-to-many IP packets 122 received during a consolidation period, and then subsequently delivers the buffered one-to-many IP packets 122 to the access terminal 114, for example, using a unicast delivery mechanism. Thus, in this aspect, the femto node 112 provides local Internet protocol (IP) access (LIPA) service to the access terminal 114 in the coverage area 118 using an efficient, consolidated delivery of one-to-many IP packets 122 from the LAN 111 at an interval. The LIPA service can further include delivery of unicast packets between the access terminal 114 and the LAN 111.

In another aspect, the femto node 112 provides LIPA service to an access terminal in the coverage area 118 via a one-to-many delivery mechanism. For example, the femto base station 116 establishes a cellular air-interface connection 132 with an access terminal 126 in the coverage area 118. The femto base station 116 supports local Internet protocol (IP) access (LIPA) by delivering the plurality of one-to-many IP packets 122 during a one-to-many cellular communication, such as a broadcast or a multicast. Thus, in this aspect, the femto node 112 provides LIPA service to the access terminal 126 in the coverage area 118 using an efficient, one-to-many cellular delivery mechanism, and optionally the femto node 112 may consolidate the one-to-many IP packets 122 from the LAN for delivery at an interval.

In a further aspect, an access terminal 129, which can be the same as access terminal 114 or access terminal 126 but moved to a different location, accesses a mobile operator network 130 via a cellular air-interface connection 132. In this case, access terminal 129 is remotely located or located outside of the coverage area (femtocell) 118 of the femto node 112. Due to the general correspondence of one femto node 112 for each femtocell 118, it should be appreciated that these terms or their equivalents can be used interchangeably in some instances. The femto node 112 has a remote network interface 134 for communicating with the mobile operator network 130 via a data packet communication channel (e.g., IP tunnel) 136 and for supporting remote Internet Protocol access (RIPA). As such, femto node 112 is able to remotely deliver the plurality of one-to-many IP packets 122 to the access terminal 129 via the remote network interface 134. Thus, in this aspect, the femto node 112 provides RIPA service to the access terminal 129 outside of the coverage area 118 using an efficient, consolidated delivery of one-to-many IP packets 122 from the LAN 111 at an interval as well as delivering packets 122 to the LAN 111 from the access terminal 129.

Figure 2:
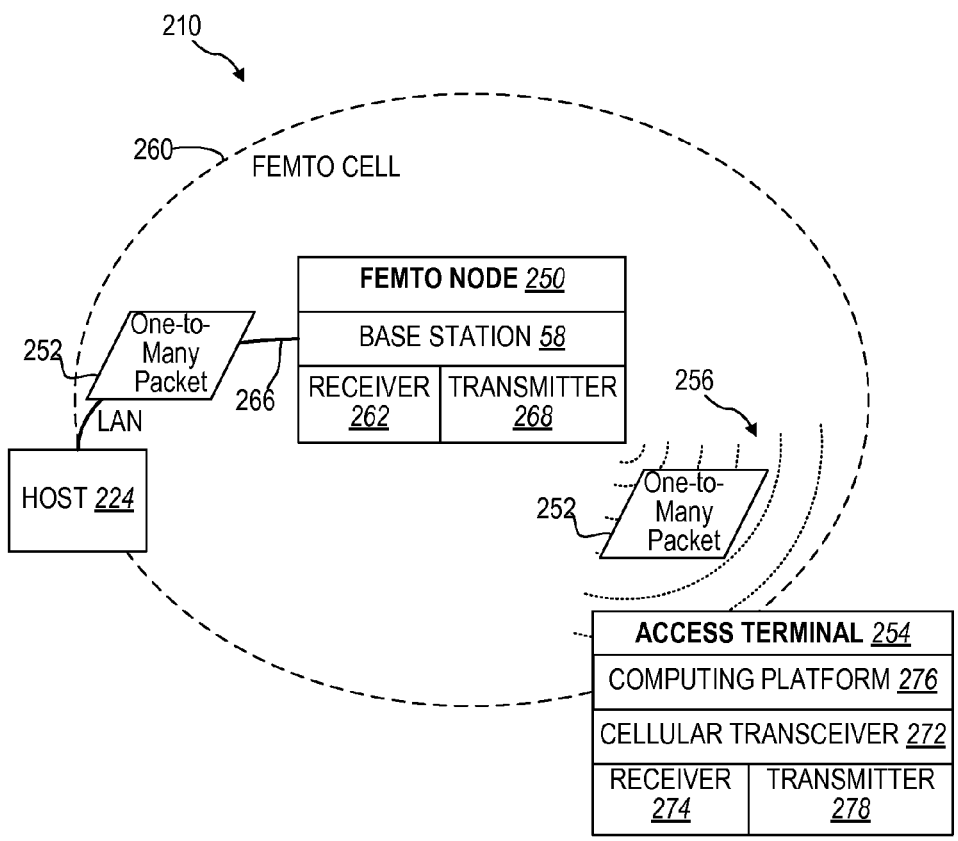
FIG. 2 is a schematic diagram of a femto node that delivers one-to-many packets of a LAN by transmitting on a cellular one-to-many (broadcast/multicast) air-interface.

Referring to FIG. 2, the aspect of the one-to-many cellular delivery mechanism is described in more detail. It is noted that the one-to-many cellular delivery mechanism may be provided as an alternative to, or in addition to, the consolidation of one-to-many IP packets received from a LAN. In FIG. 2, a femto node 250 delivers one-to-many packets 252, enabling efficient battery life for an access terminal 254 and increasing multiplexing gain, by utilizing a one-to-many (broadcast/multicast) air-interface 256. A femto base station 258 provides cellular air-interface service within a coverage area (or femtocell) 260 to the access terminal 254. A receiver 262 at the femto node 250 receives a one-to-many packet 252 from a local area network (LAN) 266. A transmitter 268 transmits the one-to-many packet 252 to the first access terminal 254 over the one-to-many (broadcast/multicast) air-interface 256.

The access terminal 254 has a cellular transceiver 272 that accesses cellular air-interface service within the coverage area 260 provided by the femto node 250. A receiver 274 receives the one-to-many packet 252 over the cellular one-to-many air-interface 256 from the femto node 250. A computing platform 276 identifies a host 224 that originated the one-to-many packet 252 that was received by the femto node 250 via the LAN 266. Further, the access terminal 254 includes a transmitter 278 that can transmit a cellular communication to the femto node 250, such as a communication destined for the host 224.

Figure 3:
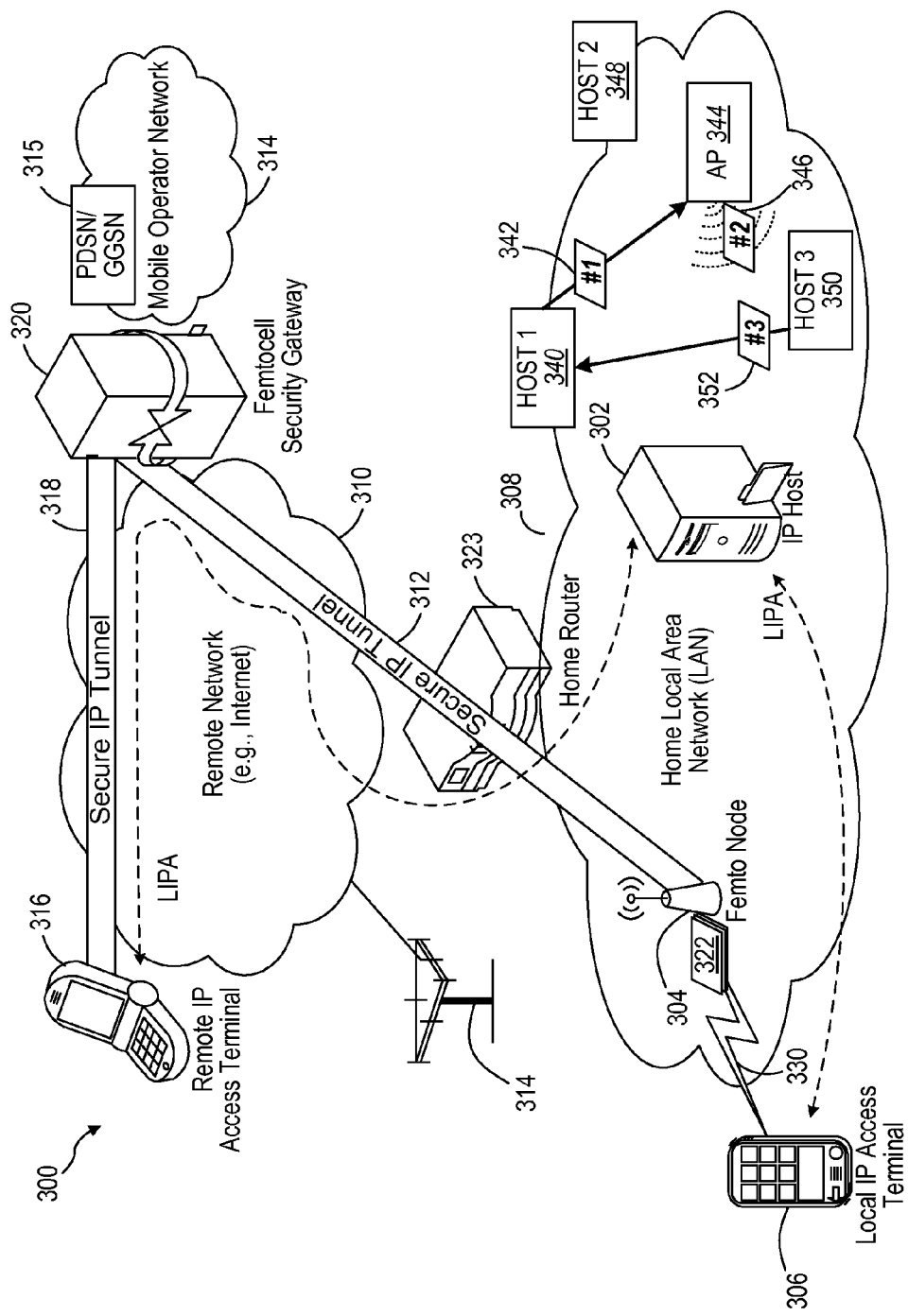
FIG. 3 is a schematic diagram of a heterogeneous communication network wherein a femto node supports Local IP Access (LIPA) and Remote IP Access (RIPA) services.

Referring to FIG. 3, further aspects of a femto node providing LIPA and/or RIPA service in an efficient manner are described. In FIG. 3, a heterogeneous communication network 300 supports Local IP Access (LIPA), which is a type of service that allows hosts (e.g., servers) 302 local to, or within coverage of or a service area of, a femto node 304 to be accessible by access terminals 306 connecting through the femto node 304 using cellular air-interfaces. For example, hosts 302 such as a media server, nanny cam, or home automation controller, can be accessed directly from the access terminal 306 without relying on a wired or wireless LAN 308. Furthermore, in one aspect, the femto node 304 enables direct access to a remote network (e.g., the Internet) 310 through a landline broadband access 312, such as via a secure IP tunnel, while bypassing cellular core networks, depicted as a mobile operator network 314 having a Packet Data Serving Node (PDSN) or Gateway GPRS Support Node (GGSN) 315, wherein GPRS refers to General Packet Radio Service. Without LIPA, AT traffic goes through a security gateway to PDSN/GGSN 315 to the Internet or its equivalent. Offloading Internet traffic from cellular core networks, such as mobile operator network 314, via the femto node 304 allows operators to reduce the operating expenses, for example, for providing data services to subscribers (e.g., user of the access terminal 306) whenever they are connected to the femto node 304. In particular, LIPA saves mobile operator networks 314 backhaul as the traffic can go to the Internet 310 directly without using a security gateway or PDSN/GGSN 315. Thus, through use of a LIPA service provided by a femto node 304, both users of access terminals 306 and operators of cellular access networks benefit.

Alternatively or in addition, the femto node 304 can provide Remote IP Access (RIPA) service. Typically, home networks or enterprise networks, depicted as the LAN 308, are protected by a firewall and thus prevent any access initiated by IP hosts, such as access terminal 316, from outside of the firewall. Furthermore, IP hosts 302 in the local area network 308 may not have public IP addresses, and therefore can only be accessed by another local IP host that also has a local IP address. RIPA is a service that allows authorized cellular subscribers, such as access terminal 316, to remotely access the local area networks 308, in a manner similar to a Virtual Private Network (VPN) service, via the femto node 304. For example, RIPA can use an IP tunnel (e.g., the IPsec connection) 318 between the femto node 304 and the core network 320, depicted as a femto security gateway. RIPA takes advantage of the cellular access terminal 316 having credentials to automate the authentication and authorization of the access terminal 316 to the local area network 308.

The access terminal 316 using RIPA service will be assigned an IP address from the network 308 that the femto node 304 resides in. IP packets can then be exchanged between the access terminal 316 and the core network 320 through a secure IP connection that traverses through a Network Address Translator and a Firewall 321, depicted as a home router.

As such, according to the present aspects, the femto node 304 may provide LIPA and/or RIPA service to efficiently deliver one-to-many (broadcast/multicast) IP packets from LAN 308 to one or more access terminals. For example, such one-to-many (broadcast/multicast) IP packets may be utilized by a host for advertising services, or for discovering services provided by another IP host (e.g., PC) 302.

For instance in an exemplary aspect of a Wireless Local Area Network (WLAN) 308, an originating IP host ("Host 1") 340 can send a one-to-many packet, such as a one-to-many IP packet depicted at 342, on a well-known User Datagram Protocol (UDP) port to a WLAN Access Point (AP) 344. The payload of the IP packet 342 contains a query of the desired service. The packet 342 is encapsulated in a unicast Medium Access Control (MAC) frame addressed only to the access point 344. The WLAN access point 344 receives the packet 342 and acknowledges Host 1 340. The WLAN access point 344 then broadcasts or multicasts the packet as depicted at 346 to other WLAN terminals, depicted as Host 2 348 and Host 3 350 as well as the IP host 302, in a MAC frame with a multicast MAC address. There is no acknowledgment from receiving terminals 302, 348, 350. If the power-saving mode is used, then the access point 344 schedules the frame to be transmitted after a special beacon frame called Delivery Traffic Indication Message (DTIM). All terminals 348, 350 in power-saving mode thus know when to wake up, receive multicast frames, and subsequently go back to sleep. The host 3 350 that provides the service that Host 1 340 is soliciting can then reply directly to Host 1 340 (based on the source IP address in the one-to-many IP packet) as depicted at 352 that it can provide such service.

A similar mechanism can also be used for advertising the service that a host may provide. In this way, hosts such as an access terminal, a PC, printer, media server, file server, etc., can discover each other. Examples of popular protocols and specifications which utilize this mechanism are Simple Service Discovery Protocol (SSDP), UPnP, and DLNA.

In these scenarios, femto node 304 can act as one of the WLAN terminals 302, 348, 350 in the WLAN 308, as depicted and may further act as a proxy for any access terminal, such as local access terminal 306, to connect to the WLAN 308 using a cellular air-interface connection with the femto node 304 (i.e., LIPA service). Alternatively to a WLAN, the femto node 304 can be a terminal in a home LAN (not shown). Alternatively or in addition, the femto node 304 can act as a proxy to any remote access terminals, such as remote AT 316, to delivery such one-to-many IP packets from the WLAN 308 ultimately delivered remotely by a cellular air-interface.

In one exemplary aspect consistent with the present innovation, femto node 304 may provide for an efficient cellular protocol based interface to the WLAN 308 for ATs 306, 316 using packet consolidation techniques described herein.

In another exemplary aspect consistent with the present innovation, the femto node 304 can use a selected one-to-many cellular transmission technique described herein to provide an efficient cellular protocol based interface to the WLAN 308 for a local AT 306.

Packet Data Delivery in Cellular Network

Conventionally, unicast packet data delivery in cellular networks is done after connection establishment. A connection requires allocation of resources (such as a channel element or MAC index) to the terminal. While the initial connection establishment takes time, subsequent data exchange in a connection is fast and efficient due to the dedicated resources that have been allocated for the connection. Therefore, a connection is maintained after a packet has been transmitted between femto node 304 and the AT 306 in case there is another packet to be transmitted. The connection is torn down only after a dormancy timer has expired. The dormancy timer is started after the last packet transmission and is reset every time a packet is transmitted. The typical value of dormancy timer is 2-10 seconds. The dormancy can generally apply to both the femto node 304 and AT 306 to accommodate packets, such as unicast packets, that originate from either one.

While a terminal is connected, it transmits its uplink pilot and also monitors a downlink traffic channel for data. Therefore, a connected terminal consumes much more energy than an idle terminal, which only needs to monitor overhead messages and pages at its paging cycle (typically just a few milliseconds for every few seconds).

With further reference to FIG. 3, the mobile device, handset or access terminal (AT) 306 arrives within the coverage or service area of the femto node 304 and can connect to the femto node 304 for cellular service. The femto node 304 performs proxy Address Resolution Protocol (ARP) and assigns a local IP address to the AT 306. Similarly, the remote AT 316 can tunnel to the femto node 304 to receive remote IP access (RIPA).

In one aspect, the femto node 304 aggregates one-to-many Internet Protocol (IP) packets 322 and then transmits the aggregated packets 322 to the AT 306, 316. Thereby, local IP access (LIPA) can be efficiently delivered without requiring the AT 306 to remain connected for an undue period, consuming battery service life and inefficiently using channel elements. Although the local femto node 304 does not directly control how a delivered packet would be remotely transmitted via a cellular connection (e.g., femtocell, macro cell, etc.), it can be assumed that there is a correspondence in the amount of time that the remote AT 316 must be connected or awake to receive individually delivered packets as compared to consolidated delivery.

The consolidation period can be a fixed duration or time period. Alternatively, the duration of the consolidation period can continue until a certain threshold is reached, such as for a count or a size of packets that have been buffered. As another alternative, the consolidation period can be buffered until a maximum delay for the first buffered packet is reached. Delivery can also be dependent upon knowledge that AT 306, 316 has with regard to an application on the AT 306, 316 that can use the packet. For example, a host that can print would not be appropriate or would not have a corresponding application in an AT that lacks any user control to print content. As another example, a host that has video or media content to delivery would not be appropriate for an AT that lacks a media player.

In a further aspect, the femto node 304 may use a one-to-many (broadcast/multicast) air-interface 330 to transmit the one-to-many packet received from the host 302 via the LAN 308 so that resources consumed by broadcasting/multicasting IP packets are independent of the number of ATs 306 camped on the femto node 304. In other words, use of the one-to-many (broadcast/multicast) air-interface 330 enables the femto node 304 to avoid having to set up separate connections for each AT. Thereby, the femto node 304 delivers one-to-many IP packets from the LAN 308 in a manner that improves battery life for the AT 306 and increases multiplexing gain for the femto node 304. For instance, a Broadcast-Multicast System (BCMCS) or Multimedia Broadcast Multicast Service (MBMS) protocol can be used for the air-interface 330. Similarly, the femto node 304 can use the one-to-many air-interface 330 by performing data-over-signaling of a control channel in either a unicast or a multicast fashion.

Local IP access (LIPA) can thus provide an experience similar to "Wi-Fi" for the AT 306, but using a cellular protocol to connect to the LAN via the femto node 304. Thus, rather than merely serving to fill holes in a coverage area of a macrocell (e.g., within a building), the femto node 304 can efficiently provide local IP access via a cellular protocol.

A simulation can show the fraction of time that a terminal in a femtocell, without practicing the present aspects, will stay connected because of one-to-many IP packets. The simulation is set up as follows. First, traces of one-to-many packets transmissions are captured in various LAN configurations. For example, in an aspect, the following three types of broadcast/multicast IP packets are captured:

(a) Subnet broadcast (e.g., destination IP address of 192.168.1.255), (b) IP broadcast (e.g., destination IP address of 255.255.255.255), and (c) SSDP multicast (e.g., destination IP address of 239.255.255.250).

The simulation is then conducted based on the arrival pattern of these one-to-many packets at the femtocell according to the traces. Based upon the arrival pattern, the duration that a terminal on the femtocell will be connected based on a typical dormancy timer mechanism is simulated for the following scenarios:

Home 1: There is only one active Windows PC that also connects to the LAN.

Home 2: This scenario is the same as Home 1 with the exception that there are also two more Windows PC, a Playstation 3 and a WiFi-enabled smartphone connected to LAN.

Enterprise 1: In this scenario, there are several dozens of Windows PCs and several network printers on the LAN.

Enterprise 2: This scenario is similar to Enterprise 1 except that the one-to-many packets are captured on WiFi instead of Ethernet.

Table 1 shows the percentage of time that a terminal on a femtocell, not practicing the described aspects, will be connected in various scenarios based on the simulation described above. The simulation assumes the downlink unicast data rate of 500 kbps. If there are no one-to-many IP packets, then the connected duration will be zero.

TABLE 1

Percentage of connection time resulting from one-to-many IP packets without use of the described aspects.

| Scenario | % of time on traffic (10 seconds dormancy) | % of time on traffic (2 seconds dormancy) | Bandwidth used for one-to-many packets |
|---|---|---|---|
| Home (no PC, no PS3 game console, no WiFi smartphone) | 35% | 7% | 0.4 kbps |
| Home (+Windows PC, PS3 game console, WiFi smartphone) | 55% | 22% | 0.9 kbps |
| Enterprise on LAN | 99.9% | 80% | 2.4 kbps |
| Enterprise on WiFi | 100% | 74% | 4.0 kbps |

The simulation results show that the terminal on a femtocell, without using the described aspects, will have severe stand-by time reduction because of the one-to-many packets. Although a reduction in the dormancy timer may be adequate when there is only one host generating one-to-many IP packet in the LAN, it is quite ineffective when there are more hosts generating the one-to-many IP packets in the LAN. Further reduction in the dormancy timer is also impractical as it will have an impact on the user's experience on the terminal, e.g., the terminal may need to re-establish the connection if the jitter or server response time is larger than the dormancy timer. Re-establishing the connection typically takes several hundreds of milliseconds before more data can be exchanged. Another interesting observation from the simulation results is that the overall bandwidth used for transmitting these one-to-many IP packets are miniscule compared to the typical throughput of 3G or 4G cellular air-interfaces.

Figure 4:
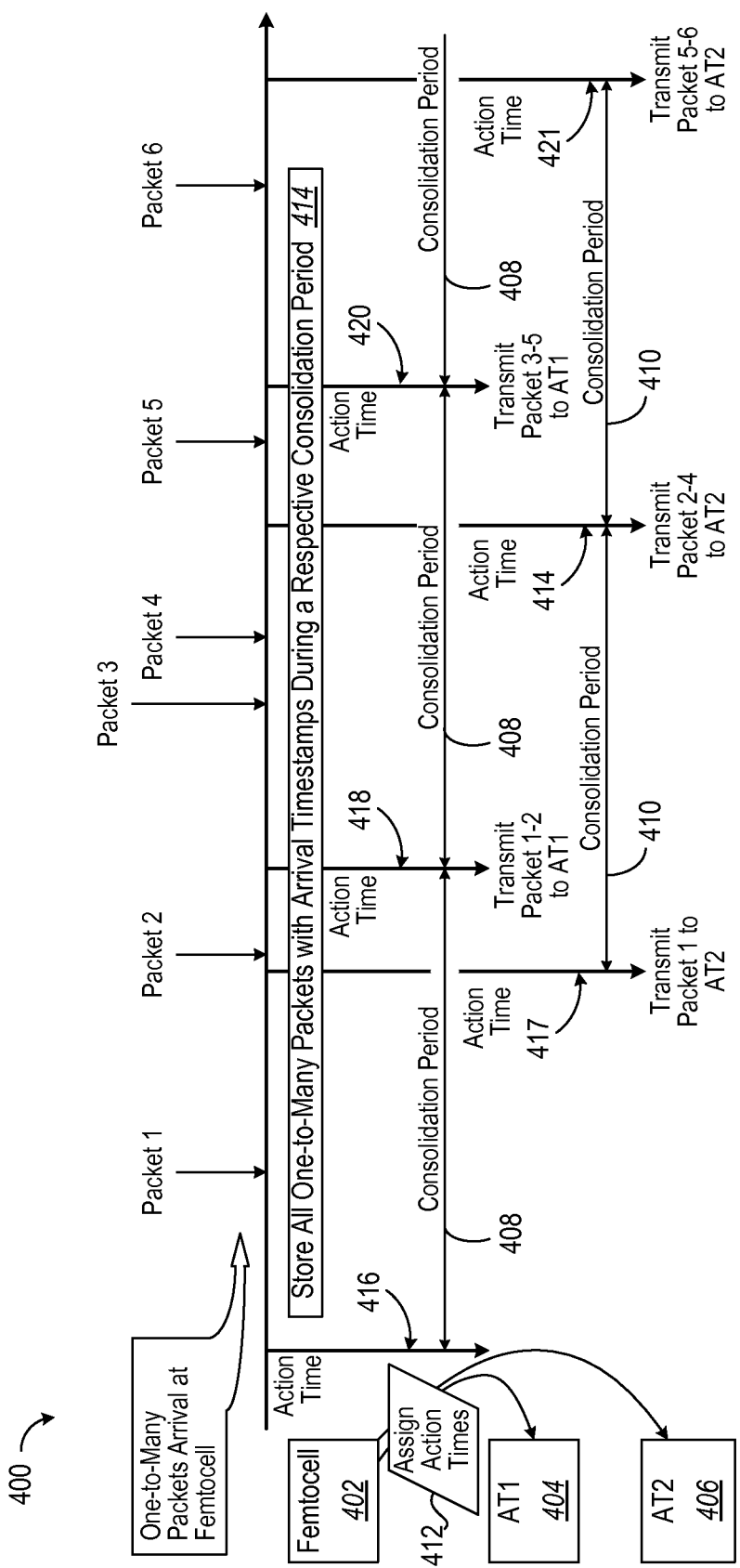
FIG. 4 is a timeline including actions associated with a femto node to consolidate packets for delivery to two access terminals.

Referring to FIG. 4, in an aspect that overcomes one or more problems identified by the simulation, an illustrative timeline 400 is depicted for a femto node 402 that consolidates one-to-many IP packets from a LAN before delivering them to an access terminal via a cellular connection. In this aspect, the one-to-many IP packets are depicted as Packets 1-6, which may sequentially arrive at the femto node 402 and be buffered prior to delivery to a first AT ("AT 1") 404 and to a second AT ("AT 2") 406. The femto node 402 is configured to deliver consolidated one-to-many IP packets to AT 1 404 at respective action times 416, 418 and 420 separated by respective first consolidation periods 408. It is noted that at action time 416, no packets have been received yet, and thus there is no delivery. The femto node 402 is also configured to deliver consolidated one-to-many IP packets to AT 2 406 at respective action times 417, 414 and 421 separated by respective second consolidation periods 410. In one aspect, as depicted at 412, the femto node 402 assigns these action times in multiples of the corresponding consolidation period respectively to the ATs 404, 406.

In an aspect, the femto node 402 may or operator of the system may provide spacing between the action times to increase the communication efficiency of the femto node 402. For example, whenever a new AT (not shown) arrives at the femto node 402, the femto node 402 assigns the initial action time such that the new initial action time is furthest from all current and future action times of existing ATs 406, 408. As such, the action times may be staggered to provide a maximum spacing between action times. Thereby, connection resources used for delivering the one-to-many or one-to-many IP packets from the LAN are efficiently multiplexed, and connections for unicast data can be established, if needed. In an exemplary aspect, establishment of staggered action times can be facilitated by implementing or provisioning for uniform consolidation periods. Alternatively, the consolidation period can be of a different length, either between ATs or between subsequent time periods for a particular AT. Alternatively or in addition, the action times for some or all ATs can be readjusted when an AT enters or leaves the coverage of the femto node (femtocell).

In one aspect, the femto node 402 buffers the one-to-many packets that arrive at the femto node 402 during particular consolidation periods 408, 410 (block 414). For instance, the one-to-many packets can be stored with their arrival timestamps. When an action time arrives, the femto node 402 determines those consolidated packets that should be unicast, such as transmitting packets 1-2 to AT 1 406 at the second action time as depicted at 418.

In an aspect, the efficiency of the femto node 402 can be improved by avoiding the transmission of duplicate one-to-many IP packets. For instance, information contained in these one-to-many packets tends to be relatively static and are rarely time critical. For example, for observed SSDP packets from the same host, every packet is the same except for an identification field in an IP header. As such, the User Datagram Protocol (UDP) is exactly the same in every packet. When a one-to-many packet arrives at the femto node 402, the femto node 402 may execute a duplication detection component, such as an algorithm or rule, to check the source IP address and the UDP checksum of the packet against the buffered packets and update the timestamp of the stored packet to the current time if the <source IP address, UDP checksum> matches. In other words, based on this process, the femto node 402 does not send packet with the earlier timestamp to the AT. Thus, femto node 402 operating the duplicate detection component reduces the space required for buffering packets and reduces bandwidth required to deliver the buffered packets to the AT.

In another aspect, the femto node 402 may further include a dormancy time reducer component to shorten a respective dormancy timer on a respective access terminal. Since the femto node 402 can be aware that it is paging the AT only to deliver buffered one-to-many packets from a LAN, the femto node 402 can reduce the dormancy timer on an AT or immediately close the connection with the AT once the buffered one-to-many packets have been delivered. Thereby, the AT standby time is improved and connection resources are reduced without impacting the user experience. In one aspect, the shortened dormancy timer can be implemented if there is no unicast packet of the AT from the time of the page until the connection closes. If a unicast packet arrives for or from the AT, then the dormancy timer can be set to the normal value. The classification of the unicast/broadcast/multicast packet can be done based on the destination address when the IP packet is received at the femto node.

In another aspect, the femto node 402 may include an expediting component to reduce a time for first delivery of one-to-many packets from a LAN to an AT. One consideration in using one-to-many packet consolidation is that a terminal on the LAN can be transmitting a one-to-many packet with new content (e.g., trying to find a host that offers a particular service). An AT will not receive this new one-to-many packet for some portion of the corresponding consolidation period, which on average would be a half of a consolidation period. This delay can degrade the user experience. To address this situation, the femto node 402 can store a table of <source (src) IP addresses, UDP check sum, and latest packet arrival timestamp> for all received packets with some multiple of the consolidation period from the current time. In general, a period of time longer than the consolidation period (i.e., a history or memory period) can be implemented that is not necessarily multiples of one consolidation period. If a one-to-many packet from a LAN arrives and does not match any packet in the table, then the femto node can schedule this new one-to-many packet for transmission immediately to all ATs. As a result, when a host starts sending new information in a one-to-many packet, then the new packet is immediately delivered. Once the one-to-many packet is repeatedly broadcasted or multicasted, the one-to-many packet can be consolidated.

For example, referring to TABLE 2, an illustrative data structure is provided for one-to-many IP packet buffering. The first three columns of information are stored for a duration of the history or memory period for expedited first delivery. When a packet with the same source address and UDP checksum arrives at the femto node, the last arrival timestamp is updated. The packet contents need only be stored for packets that arrive within the consolidation period.

TABLE 2

| SRC Address | UDP Check Sum | Last Arrival Timestamp | Packet Content |
|---|---|---|---|
| 192.168.0.4 | FEA8B2 | 12:03; 14.30 | |
| 192.168.0.5 | 39CBD5 | 12:03; 17.30 | XYZ... |
| ... | | | |

Figure 5:
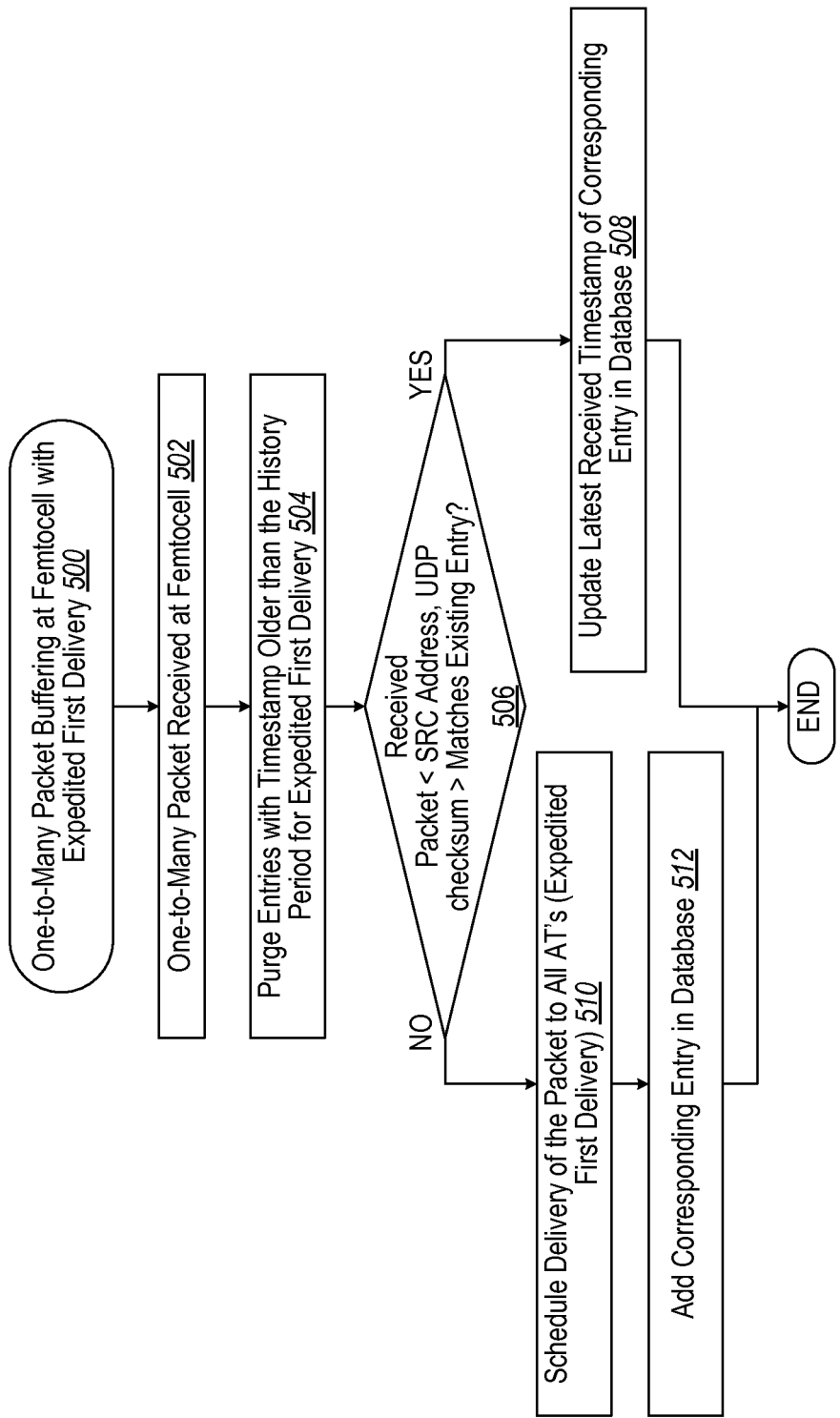
FIG. 5 is a methodology or sequence of operations for a femto node to perform buffering and expedited first delivery to a terminal of one-to-many packets associated with a local access network.

In FIG. 5, a methodology or sequence of operations 500 is depicted for one-to-many packet buffering for expedited first delivery. A one-to-many packet is received at a femto node (block 502). Entries with a timestamp older than the Memory or History Period are purged from a database. Packet content is purged from entries with a timestamp older than a consolidation period (block 504). A determination is made in block 506 whether the received packet <src address, UDP checksum> matches an existing entry. If so, then the existing entry is updated by changing the timestamp to the latest arrival time for the identical packet (block 508). If not, then delivery of the new packet is scheduled to all ATs for expedited first delivery (block 510) and the new packet is entered into the database (block 512).

Improvement in connection time can be realized by using a consolidation algorithm, such as depicted in Table 3. In the exemplary simulated scenario, it is assumed that the connection is immediately closed after one-to-many packets are delivered from the femto node to the AT.

TABLE 3

Percentage of connection time after consolidation algorithm is applied.

| | % of time on traffic channel | |
|---|---|---|
| Scenario | Non-optimized + 2 seconds dormancy | Consolidation + Immediate Connection Close |
| Home 1 | 7% | 0.08% |
| Home 2 | 22% | 0.18% |
| Enterprise 1 | 80% | 0.48% |
| Enterprise 2 | 74% | 0.80% |

Thus, if the connection closes immediately after the one-to-many packets are delivered, the connection time becomes only the duration required to transmit the packets to the terminals. The total connected time is independent of the consolidation period. The consolidation period, however, affects the number of connections (which translates into the number of pages, paging capacity, access probes and access channel load) so the consolidation period should be as long as possible that does not affect the performance of applications utilizing the one-to-many packets.

Figure 6:
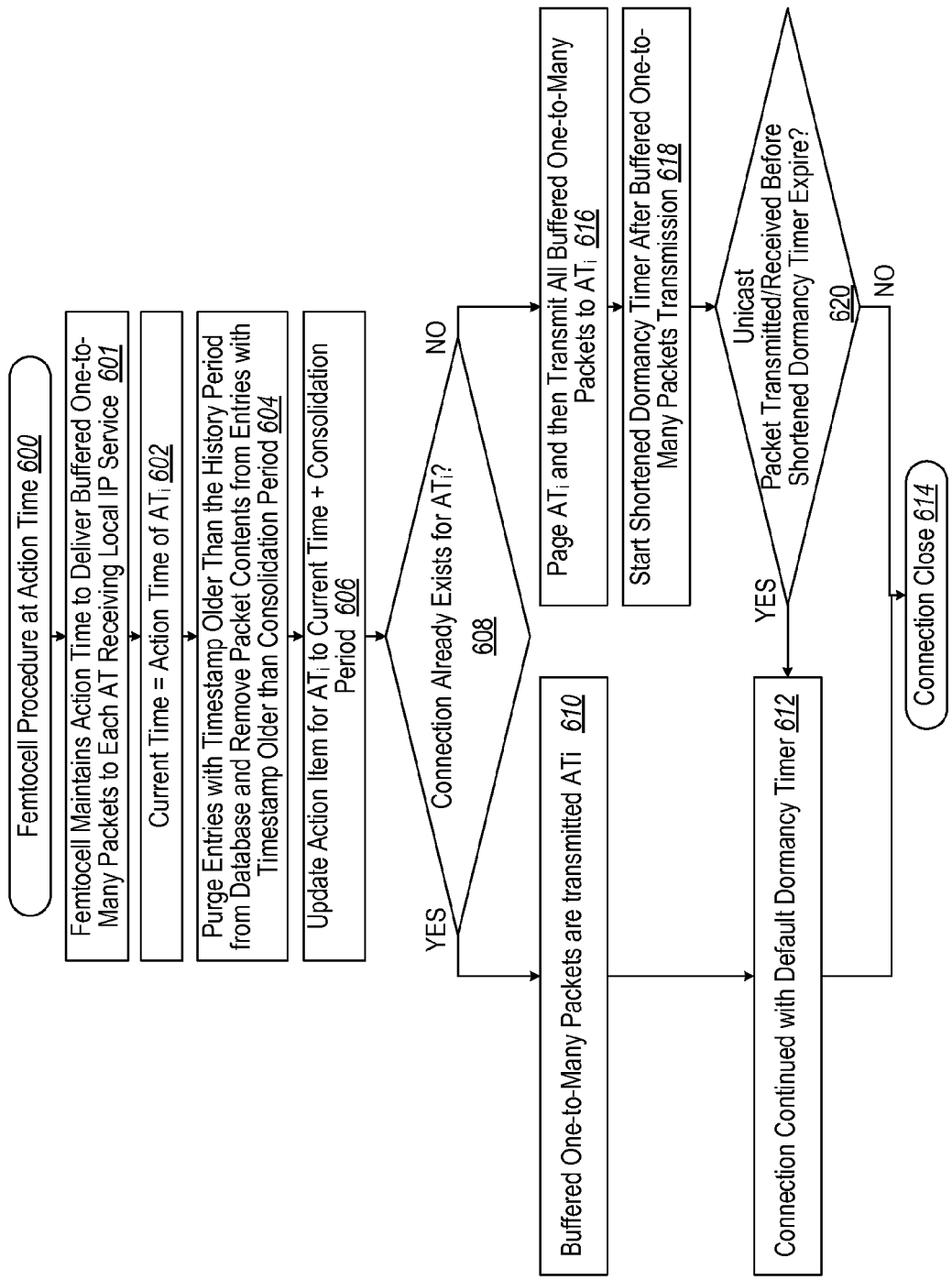
FIG. 6 is a flow diagram for a methodology or sequence of operations for femto node delivery of consolidated one-to-many packets at an action time.

In FIG. 6, a methodology or sequence of operations 600 is depicted for femtocell delivery of consolidated one-to-many packets at action time. In block 601, for each AT receiving local IP service from the femto node, the femto node maintains the action time to deliver buffered one-to-many packets to the AT. A determination is made that the current time is the action time for a particular AT ("$AT_i$") (block 602). Entries with a timestamp older than the History Period are purged from a database. Packet content is purged from entries with a timestamp older than a consolidation period (block 604). Action time for $AT_i$ is updated to the current time plus the corresponding Consolidation Period (block 606). A determination is made whether a connection already exists for $AT_i$ (block 608). If so, all buffered one-to-many packets are transmitted to $AT_i$ (block 610) and the connection is continued with the default dormancy timer (block 612). If not, the femto node pages the $AT_i$ and then transmits all buffered one-to-many packets to the $AT_i$ (block 614). A shortened dormancy timer, which can include a null period of time, is started after transmission of the buffered one-to-many packets (block 616). A determination is made whether a unicast packet is transmitted to or received from the $AT_i$ before the shortened dormancy timer expires (block 618). If so, the connection is continued with the default dormancy timer (block 612). If not, then the connection is closed (block 620).

It should be appreciated with the benefit of the present disclosure that the innovation has application to both LIPA and RIPA. For LIPA, packets are delivered locally over the air. For RIPA, packets are delivered through secure tunnel to the AT. The consolidation period can be set differently for RIPA. In one aspect, the femto node can implement the innovation, avoiding a change to air-interface or deployed applications. Broadcast/multicast packets need not be enabled on the air-interface. All types of one-to-many packets can always be available for LIPA/RIPA. In addition, implementation of the present innovation can be applicable across access technologies (e.g., CDMA2000, High Rate Packet Data (HRPD), High Speed Packet Access (HSPA), Long Term Evolved (LTE), LTE-Advanced, WiMAX, etc.).

Figure 7:
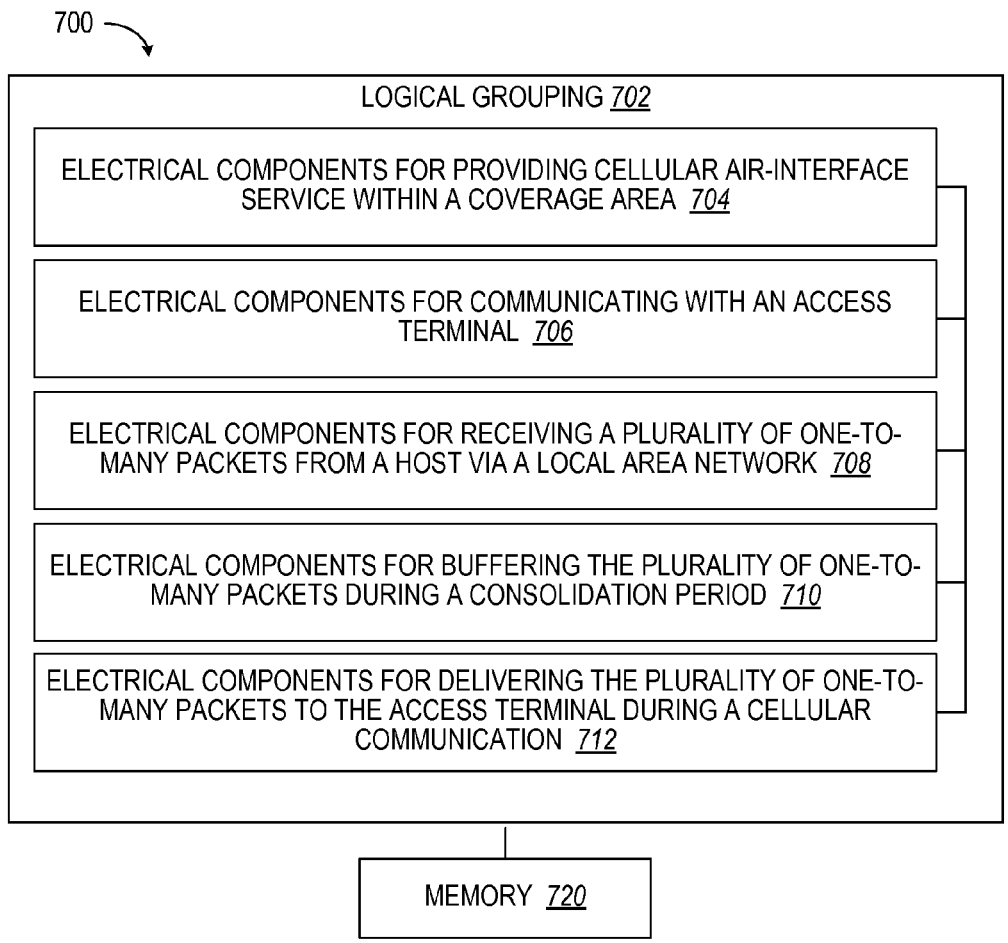
FIG. 7 is a block diagram of a logical grouping of electrical components for providing LIPA/RIPA service in a wireless communication system that is incorporated at least in part in a femto node.

With reference to FIG. 7, illustrated is a system 700 for consolidated delivery of one-to-many packets from a local access network by a femto node. For example, system 700 can reside at least partially within an access point base station such as a femto node, closed subscription cell, pico cell, etc. It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component for providing cellular air-interface service within a coverage area 704. Moreover, logical grouping 702 can include an electrical component for communicating with an access terminal 706. Further, logical grouping 702 can include an electrical component for receiving a plurality of one-to-many packets from a host via a local area network 708. Also, logical grouping 702 can include an electrical component for buffering the plurality of one-to-many packets during a consolidation period 710. Moreover, logical grouping 702 can include an electrical component for delivering the plurality of one-to-many packets to the access terminal during a cellular communication 712. Additionally, system 700 can include a memory 720 that retains instructions for executing functions associated with electrical components 704-712. While shown as being external to memory 720, it is to be understood that one or more of electrical components 704-712 can exist within memory 720.

Figure 8:
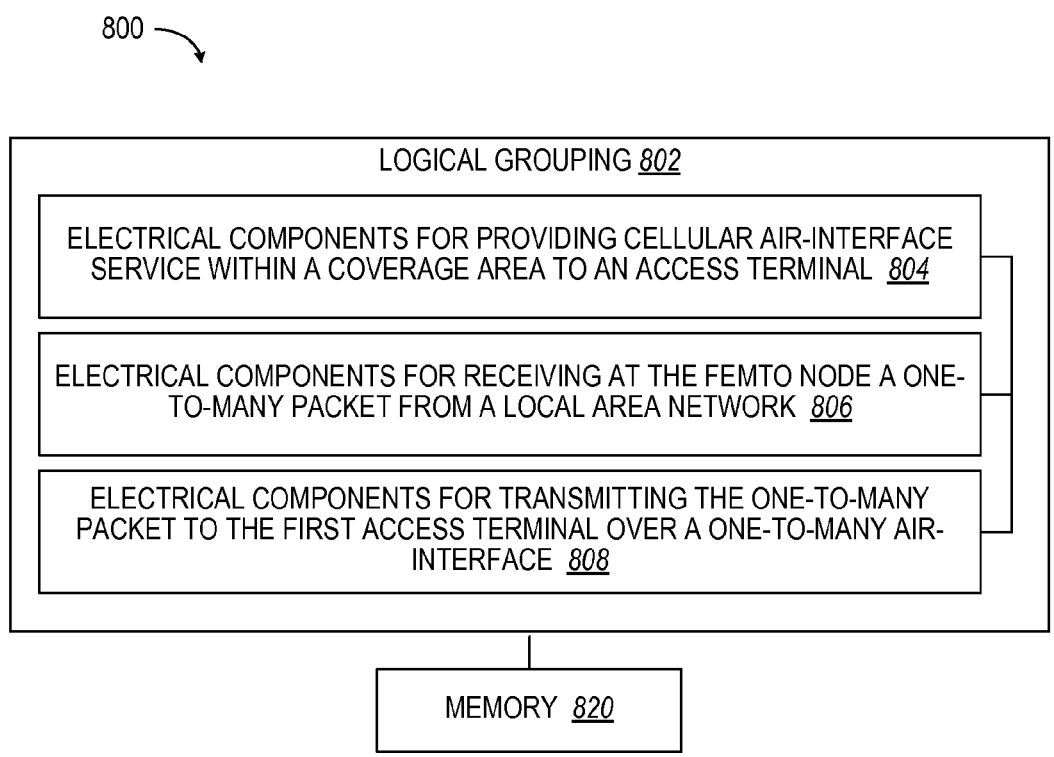
FIG. 8 is a block diagram of a logical grouping of electrical components for delivering LAN packets via a cellular one-to-many air-interface in a wireless communication system that is incorporated at least in part in a femto node.

With reference to FIG. 8, illustrated is a system 800 for delivering one-to-many packets from a local access network by a femto node. For example, system 800 can reside at least partially within an access point base station such as a femto node, closed subscription cell, pico cell, etc. It is to be appreciated that system 800 is represented as including functional blocks, which can be functional blocks that represent functions implemented by a computing platform, processor, software, or combination thereof (e.g., firmware). System 800 includes a logical grouping 802 of electrical components that can act in conjunction. For instance, logical grouping 802 can include an electrical component for providing cellular air-interface service within a coverage area to an access terminal 804. Moreover, logical grouping 802 can include an electrical component for receiving at the femto node a one-to-many packet from a local area network 806. Also, logical grouping 802 can include an electrical component for transmitting the one-to-many packet to the first access terminal over a cellular one-to-many air-interface 808. Additionally, system 800 can include a memory 820 that retains instructions for executing functions associated with electrical components 804-808. While shown as being external to memory 820, it is to be understood that one or more of electrical components 804-808 can exist within memory 820.

Figure 9:
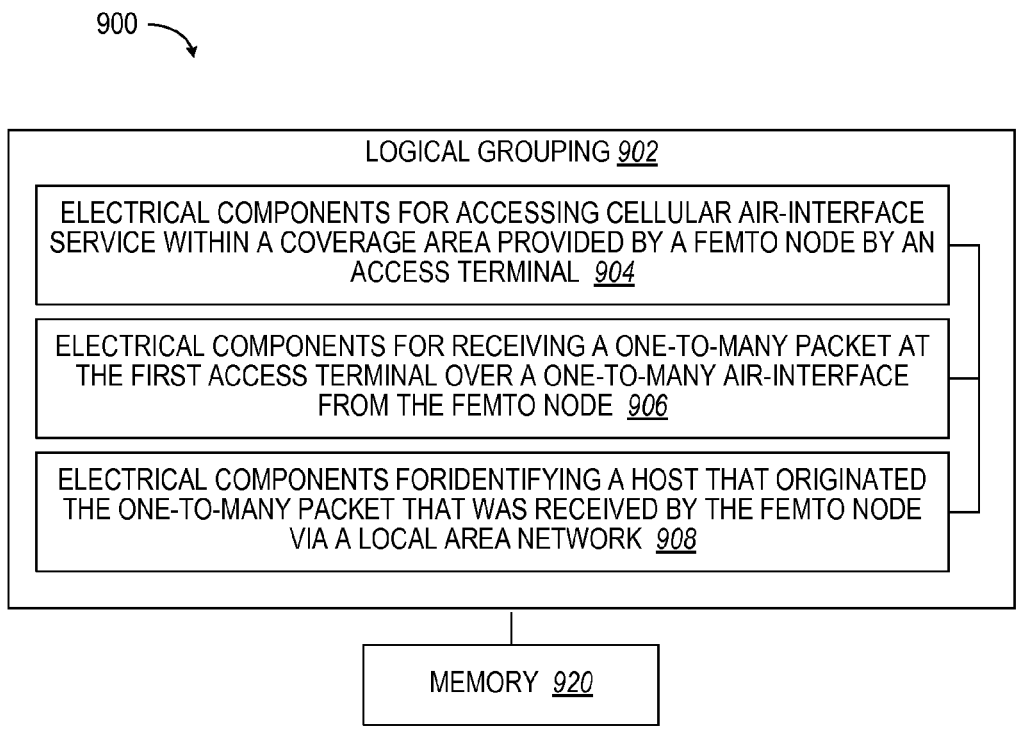
FIG. 9 is a block diagram of a logical grouping of electrical components for delivering LAN one-to-many packets via a cellular one-to-many air-interface in a wireless communication system that is incorporated at least in part in an access terminal.

With reference to FIG. 9, illustrated is a system 900 for receiving one-to-many packets from a local access network via a femto node. For example, system 900 can reside at least partially within an access terminal (AT) or user equipment (UE). It is to be appreciated that system 900 is represented as including functional blocks, which can be functional blocks that represent functions implemented by a computing platform, processor, software, or combination thereof (e.g., firmware). System 900 includes a logical grouping 902 of electrical components that can act in conjunction. For instance, logical grouping 902 can include an electrical component for accessing cellular air-interface service within a coverage area provided by a femto node by an access terminal 904. Moreover, logical grouping 902 can include an electrical component for receiving a one-to-many packet at the first access terminal over a cellular one-to-many air-interface from the femto node 906. Further, logical grouping 902 can include an electrical component for identifying a host that originated the one-to-many packet that was received by the femto node via a local area network 908. Additionally, system 900 can include a memory 920 that retains instructions for executing functions associated with electrical components 904-908. While shown as being external to memory 920, it is to be understood that one or more of electrical components 904-908 can exist within memory 920.

Figure 10:
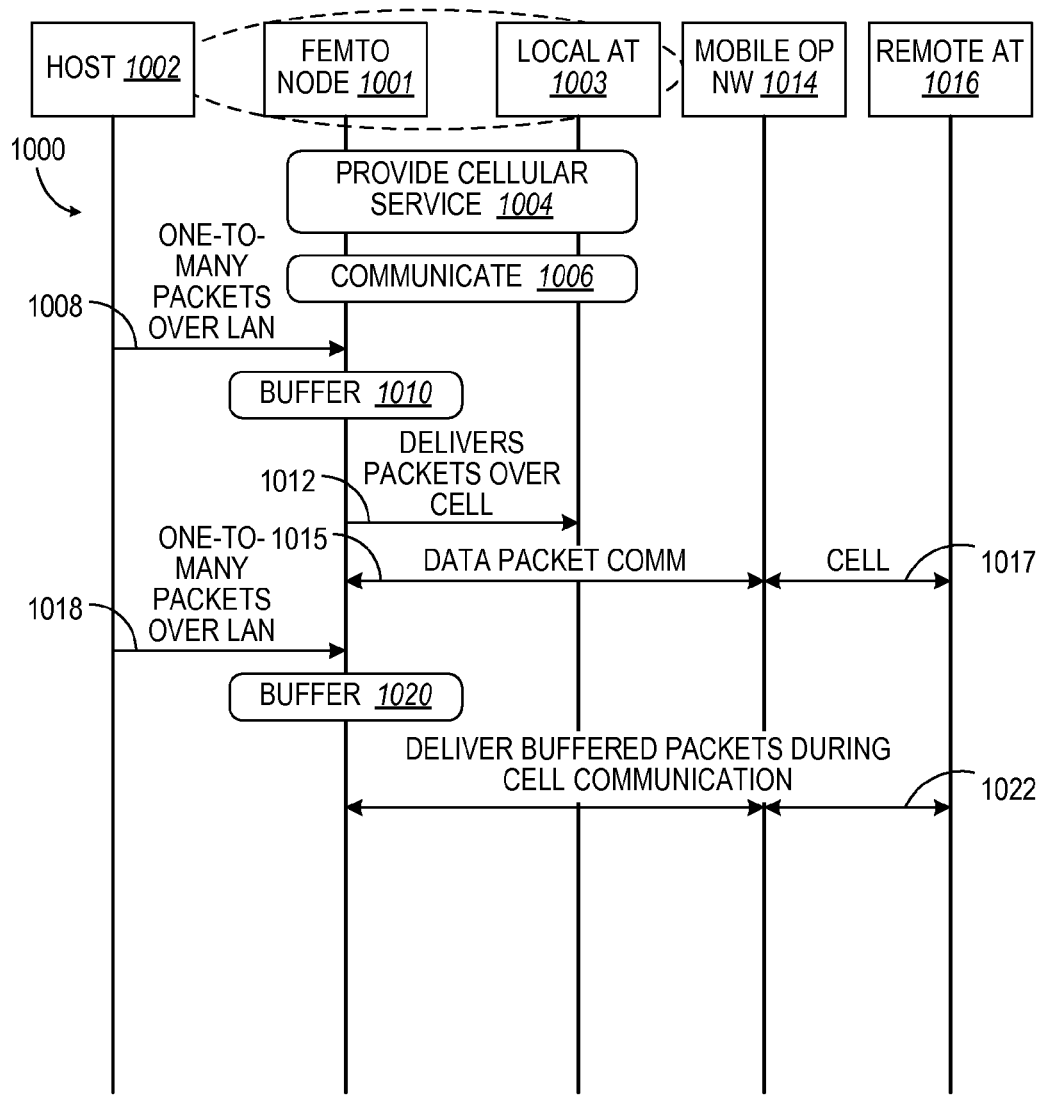
FIG. 10 is a flow diagram for a methodology or sequence of operations for consolidated delivery of one-to-many packets from a local access network by a femto node.

In use, in FIG. 10, a methodology or sequence of operations 1000 is depicted for consolidated delivery of one-to-many packets from a local access network by a femto node. In an exemplary aspect, a femto node 1001 provides LIPA service between a host 1002 and a local AT 1003. To that end, the femto node 1001 provides a cellular air-interface service within a coverage area (block 1004). The femto node 1001 communicates with the local AT 1003, which in the exemplary aspect has camped on the cellular air-interface service (block 1006). The femto node 1001 receives a plurality of one-to-many packets from the host 1002 via a local area network, depicted at 1008. The femto node 1001 buffers the plurality of one-to-many packets during a fixed or variable consolidation period (block 1010). The femto node 1001 then delivers the plurality of one-to-many packets to the access terminal during a cellular communication (e.g., cellular connection, cellular broadcast/multicast transmission, etc.) (block 1012).

In another exemplary aspect, the femto node 1001 communicates with a mobile operator network 1014 via a data packet communication channel as depicted at 1015, which in turn is in cellular communication with a remote AT 1016 as depicted at 1017. The femto node 1001 provides RIPA service to the remote AT 1016. To that end, the femto node 1001 receives a plurality of one-to-many packets from the host 1002 via a local area network (block 1018). The femto node 1001 buffers the plurality of one-to-many packets during a fixed or variable consolidation period (block 1020). The femto node 1001 then delivers the plurality of one-to-many packets to the remote AT during a cellular communication (e.g., cellular connection, cellular broadcast/multicast transmission, etc.) provided by a remote cellular access for the mobile operator network (block 1022).

In one aspect, the femto node assigns the access terminal a first plurality of action times to the first access terminal separated respectively by a consolidation period.

In another aspect, the femto node determines the consolidation period based upon a count of the plurality of one-to-many packets exceeding a threshold and pages the access terminal for delivering the plurality of one-to-many packets during a cellular connection.

In an additional aspect, a second access terminal arrives in the coverage area of the femto node. The femto node assigns a second plurality of action times to the second access terminal separated respectively by a second consolidation period, wherein the second plurality of action times are staggered from the first plurality of action times. In some aspects, the staggering may provide a maximum spacing between the first plurality of action times and the second plurality of action times.

In another additional aspect, the femto node buffers the plurality of one-to-many packets by storing a plurality of time stamped entries. For instance, the femto node can update the plurality of time stamped entries by storing a source identifier, an arrival time stamp and packet content for a first entry that arrives during a current consolidation period. The femto node can purge packet content for a second entry that arrived during a previous consolidation period.

In a further aspect, the femto node can perform duplicate detection to determine if more than one one-to-many packets sent from an identical source address with identical packet content are received during current consolidation period. The femto node can then update a time stamp for a single time entry to a most recent arrival time of the duplicate one-to-many packet.

In yet another aspect, the femto node can determine whether a one-to-many packet is unique by comparing source addresses and packet contents, respectively, for a plurality of one-to-many packets tracked over a period longer than the consolidation period. The femto node can then page the access terminal and transmit the unique one-to-many packet without waiting for the next action time.

In yet another aspect, the femto node can reduce a dormancy timer in response to determining that paging of the access terminal is for the plurality of one-to-many packets. For instance, the femto node can reduce the dormancy timer to zero for immediately terminating a connection after transmitting the plurality of one-to-many packets. Alternatively, the femto node can increase the dormancy timer to a default value in response to a unicast packet received from or transmitted to the access terminal during a cellular communication.

In yet an additional aspect, the femto node can discard a one-to-many packet from the local area network without delivering the packet to an access terminal in response to determining that the access terminal lacks a corresponding application. Thus, in some instances, the femto node can discard one-to-many IP packets rather than employing a consolidation algorithm. For instance, the femto node can determine or an access terminal can indicate that no applications on the access terminal require one-to-many IP packets. Similarly, the femto node can transmit a one-to-many (broadcast/multicast) transmission such that only access terminals that would benefit from one-to-many IP packets are tuned to receive them.

In yet another additional aspect, the femto node can deliver the plurality of one-to-many packets during a cellular connection.

In yet a further aspect, the femto node can deliver the plurality of one-to-many packets by cellular communication by transmitting via a broadcast or multicast air-interface. For example, the femto node can transmit the plurality of one-to-many packets via a Broadcast-Multicast System (BCMCS) air-interface. For another example, the femto node can transmit the plurality of one-to-many packets via a Multimedia Broadcast Multicast Service (MBMS) air-interface. For an additional example, the femto node can schedule an access terminal to receive the plurality of one-to-many packets via the broadcast or multicast air-interface in a time slot adjacent to another time slot scheduled for the access terminal to receive overhead information, such as by immediately following transmission of a synchronous capsule in High Rate Packet Data (HRPD).

In yet one further aspect, the femto node can transmit the plurality of one-to-many packets at a multiple number of control channel cycles.

In yet another further aspect, the femto node can transmit the plurality of one-to-many packets on data over signaling via a control channel.

In yet an additional further aspect, the femto node can transmit the control channel for unicast decoding or for multicast decoding.

Figure 11:
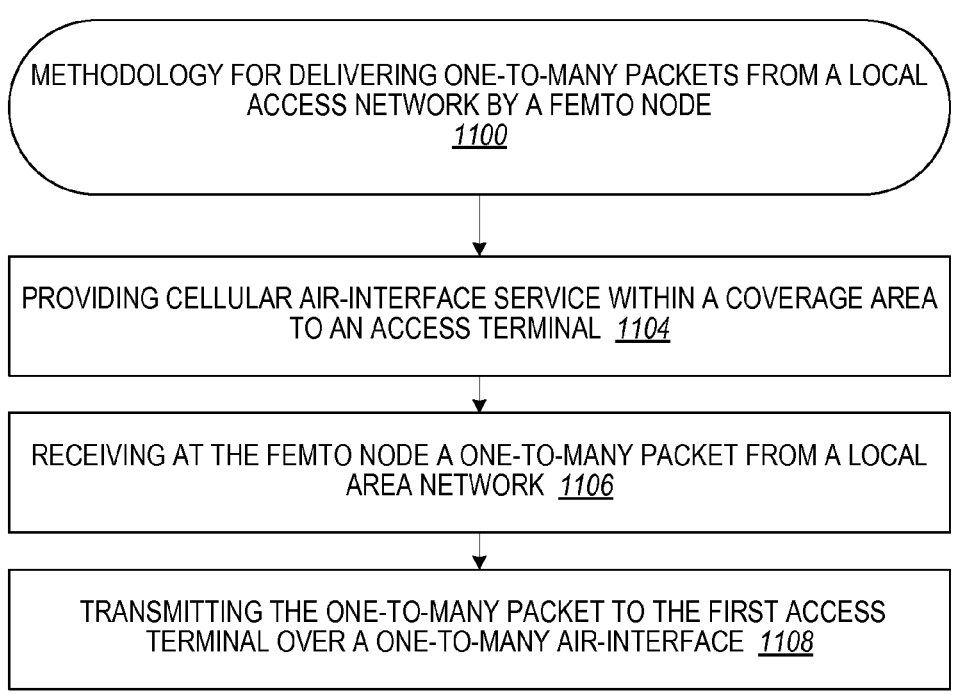
FIG. 11 is a flowchart of a methodology or sequence of operations for delivering one-to-many packets from a local access network over a cellular one-to-many air-interface by a femto node to an access terminal.

In FIG. 11, a methodology or sequence of operations 1100 is depicted for delivering one-to-many packets from a local access network by a femto node, which may, for example, enable efficient battery life for an access terminal or increase multiplexing gain, or both. The femto node provides cellular air-interface service having a coverage area (block 1104). The femto node receives a one-to-many (broadcast/multicast) IP packet from a wired or wireless local area network (block 1106). The femto node transmits the one-to-many packet over a cellular one-to-many air-interface (block 1108).

Figure 12:
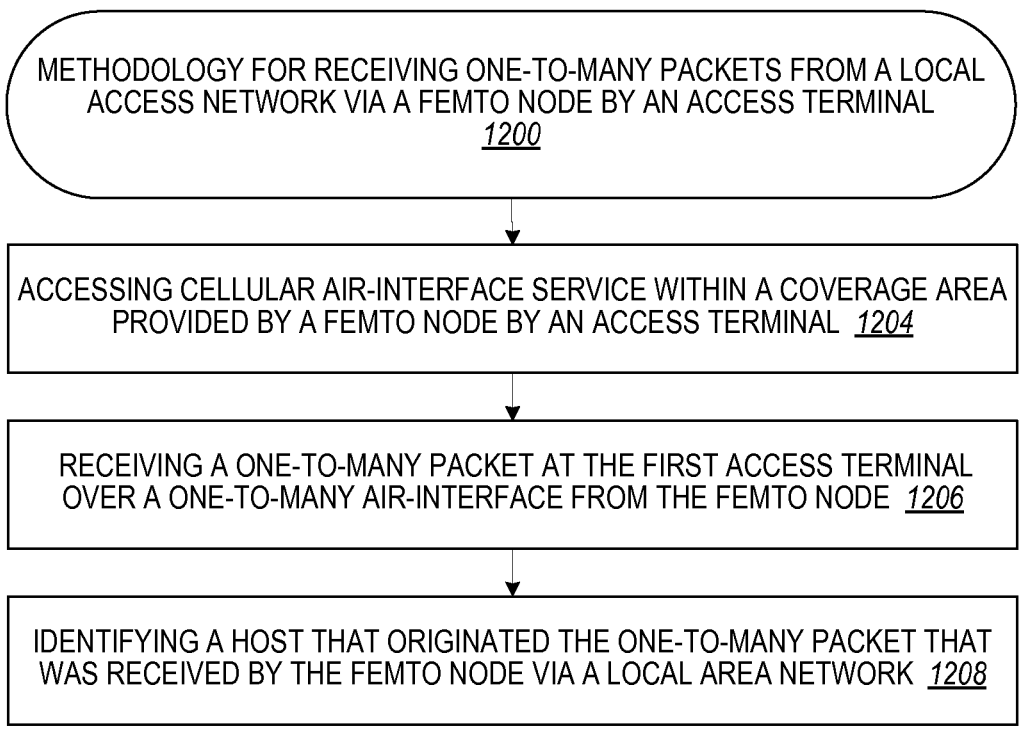
FIG. 12 is a flowchart of a methodology or sequence of operations for receiving one-to-many packets of a local access network over a cellular one-to-many air-interface from a femto node by an access terminal.

In FIG. 12, a methodology or sequence of operations 1200 is depicted for receiving one-to-many packets from a local access network via a femto node by an access terminal, which may, for example, enable efficient battery life for the access terminal or increase multiplexing gain, or both. The access terminal accessing cellular air-interface service within a coverage area provided by a femto node (block 1204). The access terminal receives a one-to-many packet over a cellular one-to-many air-interface from the femto node (block 1206). The access terminal identifies the host that originated the one-to-many packet that was received by the femto node via a local area network (block 1208).

In one aspect, the femto node transmits the one-to-many packet via a broadcast or multicast air-interface for reception by the access terminal.

In another aspect, the femto node transmits the one-to-many packet via a Broadcast-Multicast System (BCMCS) air-interface for reception by the access terminal.

In an additional aspect, the femto node transmits the one-to-many packet via a Multimedia Broadcast Multicast Service (MBMS) air-interface for reception by the access terminal.

In another additional aspect, the femto node schedules the access terminal to receive the one-to-many packet via the one-to-many air-interface in a time slot adjacent to another time slot scheduled for the access terminal to receive overhead information.

In a further aspect, the femto node schedules the access terminal the transmission of the one-to-many packet to immediately following transmission of a synchronous capsule in High Rate Packet Data (HRPD).

In yet one aspect, the femto node transmits the one-to-many packet at a multiple number of control channel cycles for reception by the access terminal.

In yet another aspect, the femto node transmits the one-to-many packet on data over signaling via a control channel for reception by the access terminal.

In yet an additional aspect, the femto node transmits the control channel for unicast decoding with a unicast access terminal identifier for reception by the access terminal.

In yet another additional aspect, the femto node transmits the control channel message for multicast decoding with a multicast access terminal identifier for reception by the access terminal.

In yet another additional aspect, the femto node transmits the control channel message for broadcast decoding with broadcast cast access terminal identifier for reception by the access terminal.

In yet another aspect, the femto node may use a one-to-many air-interface. For example, if the terminals and the femto node are capable of delivering packets through a one-to-many channel, e.g., either through Broadcast Multicast Service for cdma2000 or Multimedia Broadcast Multicast Service for UMTS, then the broadcast/multicast IP packets in the local networks may be delivered through this channel. While doing so is arguably the most efficient mean of transporting one-to-many IP packets on femto nodes, cellular one-to-many services capability is not commonly supported on typical terminals and also requires substantial development efforts on the femto nodes.

In any case, the consolidation algorithm can be used to complement the use of one-to-many air-interfaces, e.g., where the action time of all terminals capable of one-to-many air-interface can be identical, thus providing a gradual migrating path towards a more efficient mechanism without requiring its support at the initial LIPA/RIPA service launch.

In order to reduce the number of instances where the terminals need to be connected to receive one-to-many packets, it may be possible for each terminal to indicate to the femto node to deliver only the packets advertising the services that it is interested in. In this case, the femto node includes logic to understand the 'services' and also to perform packet content inspection on every one-to-many IP packet to check for services. When new services are defined or used, then the femto nodes may also need to be upgraded.

By virtue of the foregoing, it should be appreciated that the consolidation algorithm can work for both Local IP access and Remote IP access, addressing deficiencies conventionally encountered. As Remote IP access traffic is protected by a secure IP tunnel between the terminal and the femto node, the base station that the terminal connects to over-the-air may not perform optimization to deliver the one-to-many IP packets. Therefore, consolidating or discarding one-to-many IP packets may not be at the remote base station. However, the femto node can consolidate the packets before transmitting them into the secure IP tunnel to realize a reduced number of connections and duration of connection at the access terminal. The consolidation period that is used for RIPA may be set differently from LIPA.

In one aspect, it should thus be appreciated with the benefit of the present disclosure that this innovation can be implemented just in the femto node with no change in existing cellular air-interfaces or applications. This implementation approach can be especially useful for early implementation of LIPA where the femto node uses packet snooping and insertion for existing terminals that are not enhanced to explicitly support LIPA.

With regard to use of one-to-many air-interface, in one aspect Broadcast-Multicast System (BCMCS) or Multimedia Broadcast Multicast Service (MBMS) air-interface can be used to transmit one-to-many IP packets in a one-to-many air-interface. Thereby, resources consumed by one-to-many IP packets are independent of the number of ATs camped on the femto node. In one aspect, to improve standby time the femto node can configure the one-to-many slot to be adjacent to the slot that the AT already has to wake up to monitor overhead information (e.g., following the synchronous capsule in HRPD). Since different ATs are hashed to different control channel cycles, the same one-to-many IP packets may need to be broadcasted or multicasted multiple times to reach all of the ATs. The one-to-many IP packets may be consolidated and broadcasted or multicasted only at some multiples of control channel cycles for additional efficiency.

Alternatively, data-over-signaling can be used for supporting one-to-many IP packets. In one aspect, data can be sent over HRPD control channel. The AT can go back to sleep immediately after receiving the packet. In another aspect, data-over-signaling can be used in either unicast manner (i.e., directed to a particular user addressed by Unicast Access Terminal Identifier (UATI)) or multicast manner (e.g., addressed to multiple ATs using Multicast Access Terminal Identifier (BATI) or broadcast manner (e.g., addressed to all ATs using Broadcast Access Terminal Identifier (BATI)). Since different ATs are hashed to different control channel cycles, the same one-to-many IP packets may need to be broadcasted or multicasted multiple times to reach all of the ATs. The one-to-many IP packets may be consolidated and broadcasted or multicasted only at some multiple of control channel cycles for additional efficiency. With regard to one-to-many air-interface, this approach supports LIPA. However, for RIPA, a macro network may not be aware of the packet contents for RIPA and may not support BCMCS or data-over-signaling.

The above-described aspects may be utilized in any communication system including a femto node. Femto nodes are personal miniature base stations installed on a subscriber's premises for providing cellular service within a home or enterprise environment. Typically, femto nodes are connected to the Internet and a cellular operator's network via a landline broadband access, such as a digital subscriber line (DSL) or cable modem. Access to a femto node can be open to any subscriber, restricted to a limited set of users, or a combination of both, and may include priority for preferred users.

For example, wireless communication systems are widely deployed to provide various types of communication content such as voice, data, and so on. These systems may be multiple access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, and orthogonal frequency division multiple access (OFDMA) systems.

Generally, a wireless multiple access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output (SISO), multiple-input-single-output (MISO), single-input-multiple-output (SIMO) or a multiple-input-multiple-output (MIMO) system.

Universal Mobile Telecommunications System (UMTS) is one of the third-generation (3G) cell phone technologies. UTRAN, short for UMTS Terrestrial Radio Access Network, is a collective term for the base nodes (Node B's) and Radio Network Controllers (RNC) which make up the UMTS core network. This communications network can carry many traffic types, from real-time Circuit Switched to IP based Packet Switched. The UTRAN allows connectivity between the UE (user equipment) and the core network. The UTRAN contains the base stations, which are called Node Bs, and RNCs. The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

Third Generation Partnership Project (3GPP) LTE (Long Term Evolution) is the name given to a project within the 3GPP to improve the UMTS mobile phone standard to cope with future requirements. Goals include improving efficiency, lowering costs, improving services, making use of a new spectrum of opportunities, and better integration with other open standards. The LTE system is described in the Evolved UTRA (EUTRA) and Evolved UTRAN (EUTRAN) series of specifications. In order to provide improved communication services and increased efficiency, cellular communication systems are continuously developed and enhanced. Currently, the 3rd Generation Partnership Project (3GPP) standards body is in the process of standardizing improvements to the Universal Mobile Telecommunication System (UMTS) known as LTE.

Similarly, to advanced communication services, such as High Speed Downlink Packet Access (HSDPA) and High Speed Uplink Packet Access (HSUPA), LTE uses a very fast scheduling of communication resources allocated to user traffic and control data over the air interface. Specifically, scheduling for user traffic may be performed in the individual serving base station (eNodeB) thereby allowing scheduling to be so fast that it can follow changes in the characteristics of the propagation channels to the individual User Equipments (UEs). This is used to schedule data for UEs such that data is predominantly scheduled for UEs which currently experience advantageous propagation conditions. The fast scheduling may be performed both for uplink user data traffic transmitted on a physical channel known as the Physical Uplink Shared CHannel (PUSCH) and for downlink user data traffic transmitted on a physical channel known as the Physical Downlink Shared CHannel (PDSCH).

In some aspects the teachings herein may be employed in a network that includes macro scale coverage (e.g., a large area cellular network such as a 3G or 4G network, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femtocell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femtocell, and so on.

Figure 13:
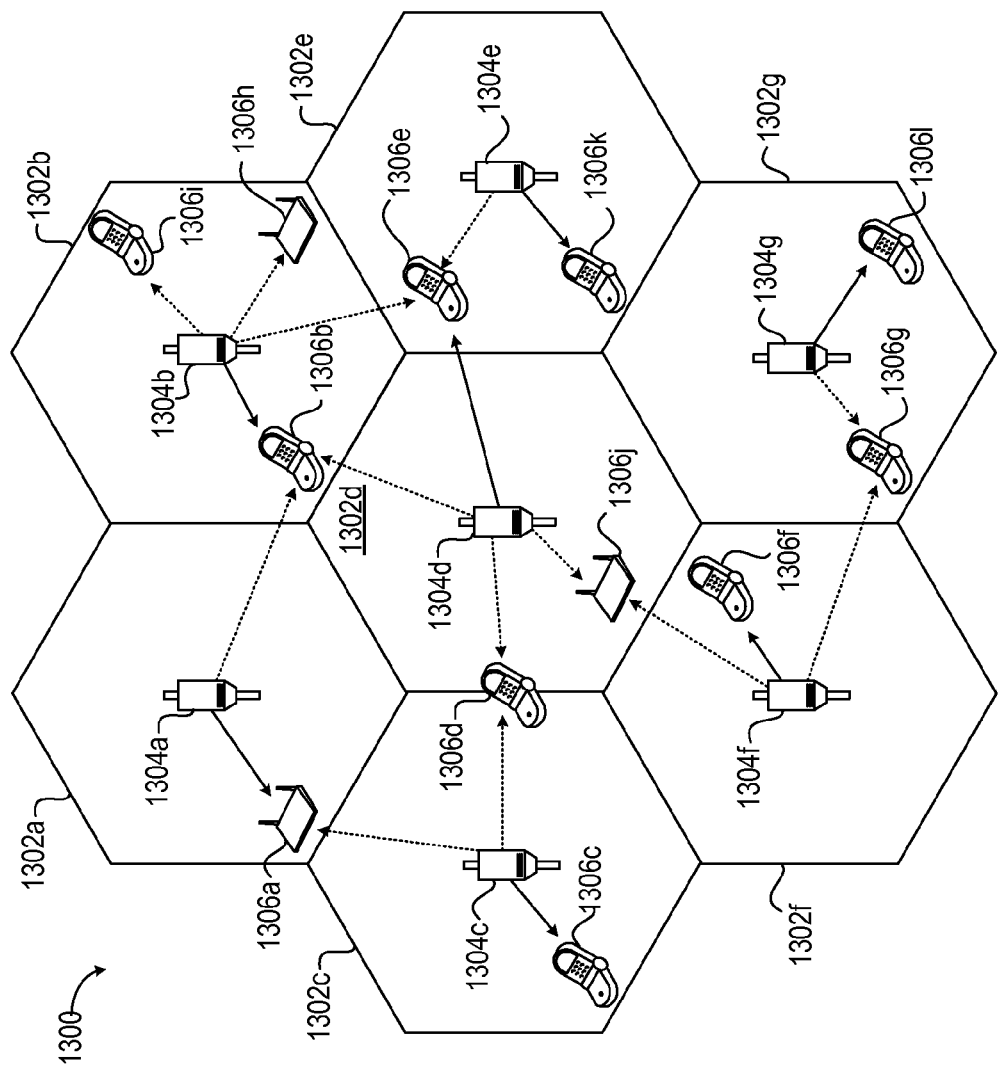
FIG. 13 is a schematic diagram of a wireless communication system configured to support a number of users.

FIG. 13 illustrates a wireless communication system 1300, configured to support a number of users, in which the teachings herein may be implemented. The system 1300 provides communication for multiple cells 1302, such as, for example, macro cells 1302a-1302g, with each cell being serviced by a corresponding access node 1304 (e.g., access nodes 1304a-1304g). As shown in FIG. 13, access terminals 1306 (e.g., access terminals 1306a-1306l) may be dispersed at various locations throughout the system over time. Each access terminal 1306 may communicate with one or more access nodes 1304 on a forward link ("FL") and/or a reverse link ("RL) at a given moment, depending upon whether the access terminal 1306 is active and whether it is in soft handoff, for example. The wireless communication system 1300 may provide service over a large geographic region. For example, macro cells 1302a-1302g may cover a few blocks in a neighborhood.

Figure 14:
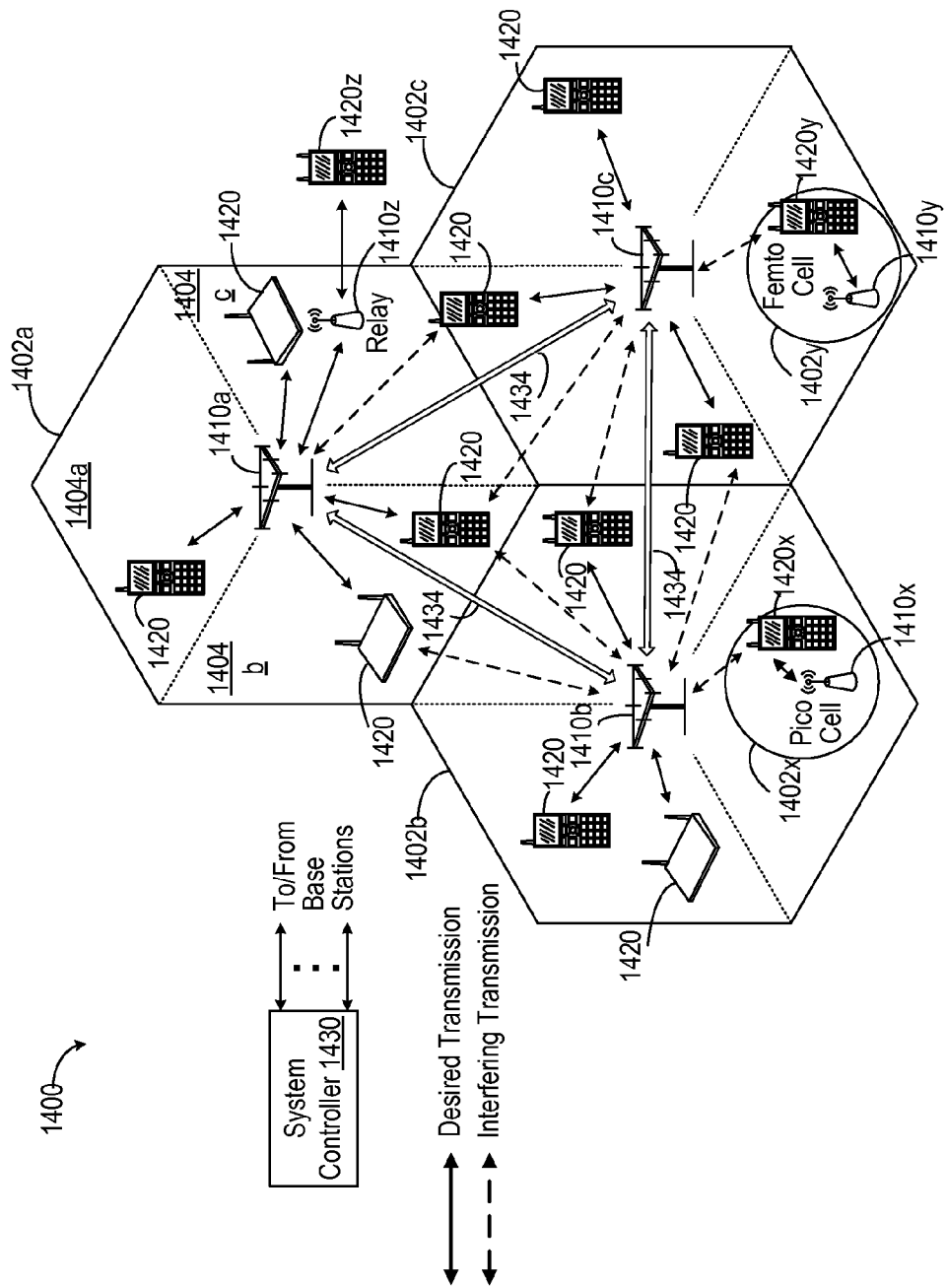
FIG. 14 is a schematic diagram of a wireless communication system comprising macro cells, femtocells and pico cells.

In the example shown in FIG. 14, base stations 1410a, 1410b and 1410c may be macro base stations for macro cells 1402a, 1402b and 1402c, respectively. Base station 1410x may be a pico base station for a pico cell 1402x communicating with terminal 1420x. Base station 1410y may be a femto base station for a femtocell 1402y communicating with terminal 1420y. Although not shown in FIG. 14 for simplicity, the macro cells may overlap at the edges. The pico and femtocells may be located within the macro cells (as shown in FIG. 14) or may overlap with macro cells and/or other cells.

Wireless network 1400 may also include relay stations, e.g., a relay station 1410z that communicates with terminal 1420z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 1430 may couple to a set of base stations and provide coordination and control for these base stations. Network controller 1430 may be a single network entity or a collection of network entities. Network controller 1430 may communicate with base stations 1410 via a backhaul. Backhaul network communication 1434 can facilitate point-to-point communication between base stations 1410a-1410c employing such a distributed architecture. Base stations 1410a-1410c may also communicate with one another, e.g., directly or indirectly via wireless or wireline backhaul.

Wireless network 1400 may be a homogeneous network that includes only macro base stations (not shown in FIG. 14). Wireless network 1400 may also be a heterogeneous network that includes base stations of different types, e.g., macro base stations, pico base stations, home base stations, relay stations, etc. These different types of base stations may have different transmit power levels, different coverage areas, and different impact on interference in wireless network 1400. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 1420 may be dispersed throughout wireless network 1400, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 14, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 1400 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 1402a, 1402b, or 1402c corresponding to a respective base station 1410a-1410c can be partitioned into multiple smaller areas (e.g., areas 1404a, 1404b, and 1404c). Each of the smaller areas 1404a, 1404b, and 1404c can be served by a respective base transceiver subsystem (BTS, not shown). As used herein and generally in the art, the term "sector" can refer to a BTS and/or its coverage area depending on the context in which the term is used. In one example, sectors 1404a, 1404b, 1404c in a cell 1402a, 1402b, 1402c can be formed by groups of antennas (not shown) at base station 1410, where each group of antennas is responsible for communication with terminals 1420 in a portion of the cell 1402a, 1402b, or 1402c. For example, a base station 1410 serving cell 1402a can have a first antenna group corresponding to sector 1404*a*, a second antenna group corresponding to sector 1404*b*, and a third antenna group corresponding to sector 1404*c*. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 15:
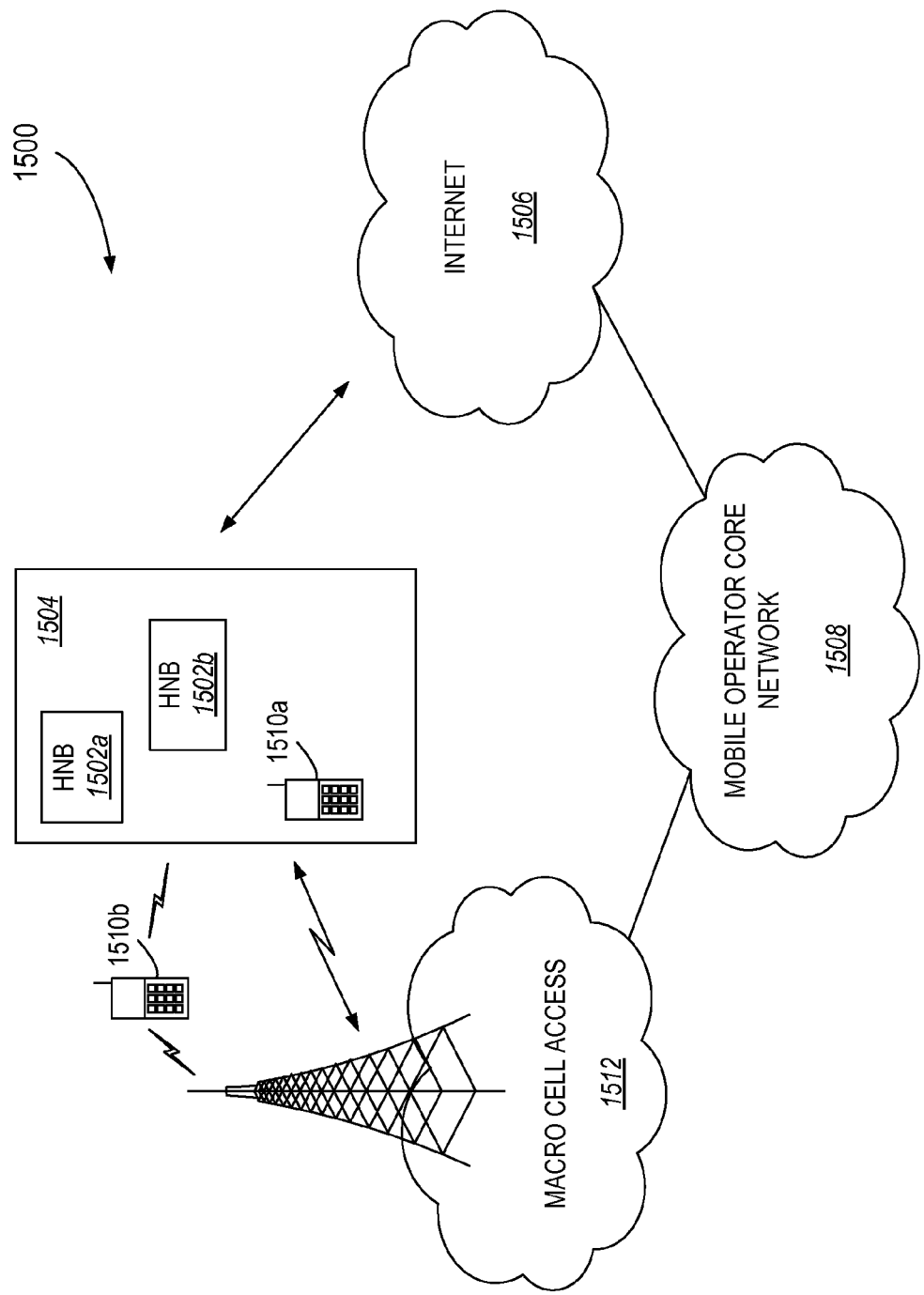
FIG. 15 is a schematic diagram of a communication system where one or more femto nodes are deployed within a network environment.

FIG. 15 illustrates an exemplary communication system 1500 where one or more femto nodes are deployed within a network environment. Specifically, the system 1500 includes multiple femto nodes, depicted as Home Base Nodes (HNBs) 1502*a* and 1502*b*, installed in a relatively small scale network environment (e.g., in one or more user residences 1504). Each femto node 1502*a*-1502*b* may be coupled to a wide area network 1506 (e.g., the Internet) and a mobile operator core network 1508 via a DSL router, a cable modem, a wireless link, or other connectivity means (not shown). As will be discussed below, each femto node 1502*a*-1502*b* may be configured to serve associated access terminals or user equipment (UE) 1510*a* and, optionally, alien access UEs 1510*b* (e.g., not a subscriber to a closed subscriber group). In other words, access to femto nodes 1502*a*-1502*b* may be restricted whereby a given UE 1510*a*-1510*b* may be served by a set of designated (e.g., home) femto node(s) 1502*a*-1502*b* but may not be served by any non-designated femto nodes 1502*a*-1502*b* (e.g., a neighbor's femto node 1502*a*-1502*b*).

The owner of a femto node 1510 may subscribe to mobile service, such as, for example, 3G mobile service, offered through the mobile operator core network 1508. In addition, an access terminal or UE 1510*a*-1510*b* may be capable of operating both in macro environments and in smaller scale (e.g., residential) network environments. In other words, depending on the current location of the UE 1510*a*-1510*b*, the access terminal 1510*a*-1510*b* may be served by an access node or macro base node 1512 of the macro cell mobile network 1508 or by any one of a set of femto nodes 1510 (e.g., the femto nodes 1502*a*-1502*b* that reside within a corresponding user residence 1504). For example, when a subscriber is outside his home, he is served by a standard macro access node (e.g., node 1512) and when the subscriber is at home, he is served by a femto node (e.g., node 1502*a*-1502*b*). Here, it should be appreciated that a femto node 1502*a*-1502*b* may be backward compatible with existing access terminals or UEs 1510*a*-1510*b*.

A femto node 1502*a*-1502*b* may be deployed on a single frequency or, in the alternative, on multiple frequencies. Depending on the particular configuration, the single frequency or one or more of the multiple frequencies may overlap with one or more frequencies used by a macro node (e.g., node 1512).

In some aspects, an access terminal or UE 1510*a*-1510*b* may be configured to connect to a preferred femto node (e.g., the home femto node of the access terminal or UE 1510*a*-1510*b*) whenever such connectivity is possible. For example, whenever the access terminal or UE 1510*a*-1510*b* is within the user's residence 1504, it may be desired that the access terminal or UE 1510*a*-1510*b* communicate only with the home femto node 1502*a*-1502*b*.

In some aspects, if the access terminal or UE 1510*a*-1510*b* operates within the macro cellular network 1508 but is not residing on its most preferred network (e.g., as defined in a preferred roaming list), the access terminal or UE 1510*a*-1510*b* may continue to search for the most preferred network (e.g., the preferred femto node 1502*a*-1502*b*) using a Better System Reselection ("BSR"), which may involve a periodic scanning of available systems to determine whether better systems are currently available, and subsequent efforts to associate with such preferred systems. With the acquisition entry, the access terminal or UE 1510*a*-1510*b* may limit the search for specific band and channel. For example, the search for the most preferred system may be repeated periodically. Upon discovery of a preferred femto node 1502*a*-1502*b*, the access terminal 1510*a*-1510*b* selects the femto node 1502*a*-1502*b* for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1502*a*-1502*b* that reside within the corresponding user residence 1504). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal or user equipment. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionalities in the context of a femto node. It should be appreciated, however, that a pico node may provide the same or similar functionality for a larger coverage area. For example, a pico node may be restricted; a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 16:
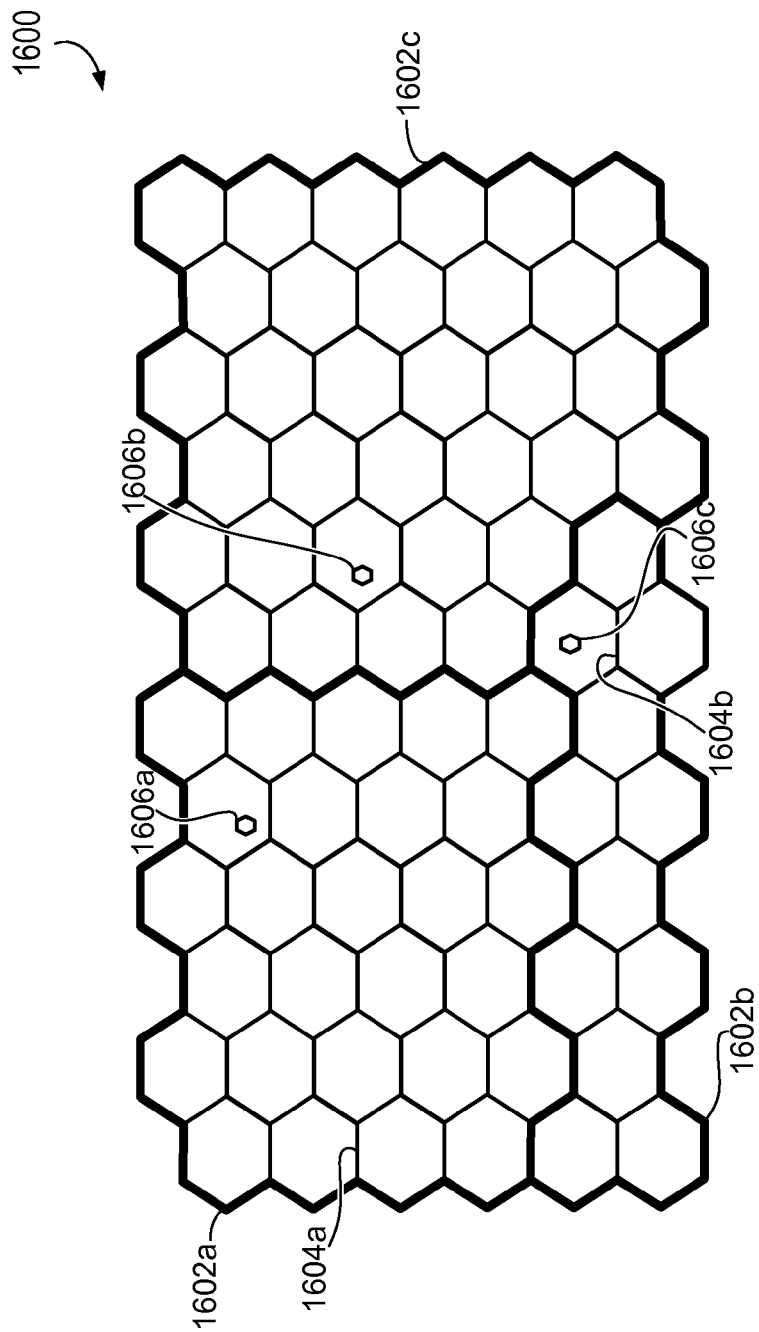
FIG. 16 is a schematic diagram of a coverage map where several tracking areas, routing areas or location areas are defined.

FIG. 16 illustrates an example of a coverage map 1600 where several tracking areas 1602 (or routing areas or location areas) are defined, each of which includes several macro coverage areas 1604. Here, areas of coverage associated with tracking areas 1602a, 1602b, and 1602c are delineated by the wide lines and the macro coverage areas 1604 are represented by the hexagons. The tracking areas 1602 also include femto coverage areas 1606. In this example, each of the femto coverage areas 1606 (e.g., femto coverage area 1606c) is depicted within a macro coverage area 1604 (e.g., macro coverage area 1604b). It should be appreciated, however, that a femto coverage area 1606 may not lie entirely within a macro coverage area 1604. In practice, a large number of femto coverage areas 1606 may be defined with a given tracking area 1602 or macro coverage area 1604. Also, one or more pico coverage areas (not shown) may be defined within a given tracking area 1602 or macro coverage area 1604.

Figure 17:
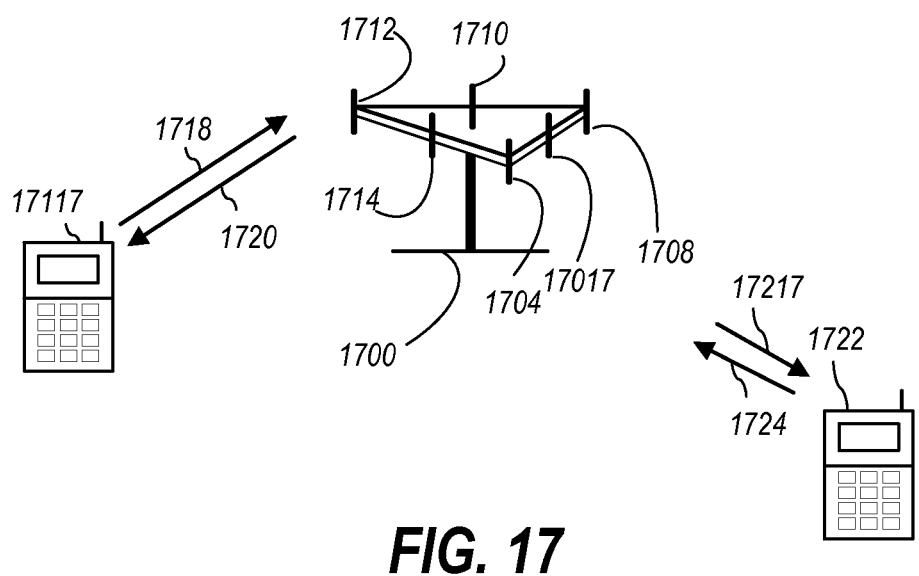
FIG. 17 is a schematic diagram of a multiple access wireless communication system.

Referring to FIG. 17, a multiple access wireless communication system according to one aspect is illustrated. An access point (AP) 1700 includes multiple antenna groups, one including 1706 and 1706, another including 1708 and 1710, and an additional including 1712 and 1714. In FIG. 17, only two antennas are shown for each antenna group, however, more or fewer antennas may be utilized for each antenna group. Access terminal (AT) 1716 is in communication with antennas 1712 and 1714, where antennas 1712 and 1714 transmit information to access terminal 1716 over forward link 1720 and receive information from access terminal 1716 over reverse link 1718. Access terminal 1722 is in communication with antennas 1706 and 1708, where antennas 1706 and 1708 transmit information to access terminal 1722 over forward link 1726 and receive information from access terminal 1722 over reverse link 1724. In a FDD system, communication links 1718, 1720, 1724 and 1726 may use different frequencies for communication. For example, forward link 1720 may use a different frequency then that used by reverse link 1718.

Each group of antennas and/or the area in which they are designed to communicate is often referred to as a sector of the access point. In the aspect, antenna groups each are designed to communicate to access terminals in a sector, of the areas covered by access point 1700.

In communication over forward links 1720 and 1726, the transmitting antennas of access point 1700 utilize beamforming in order to improve the signal-to-noise ratio of forward links for the different access terminals 1716 and 1722. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 18:
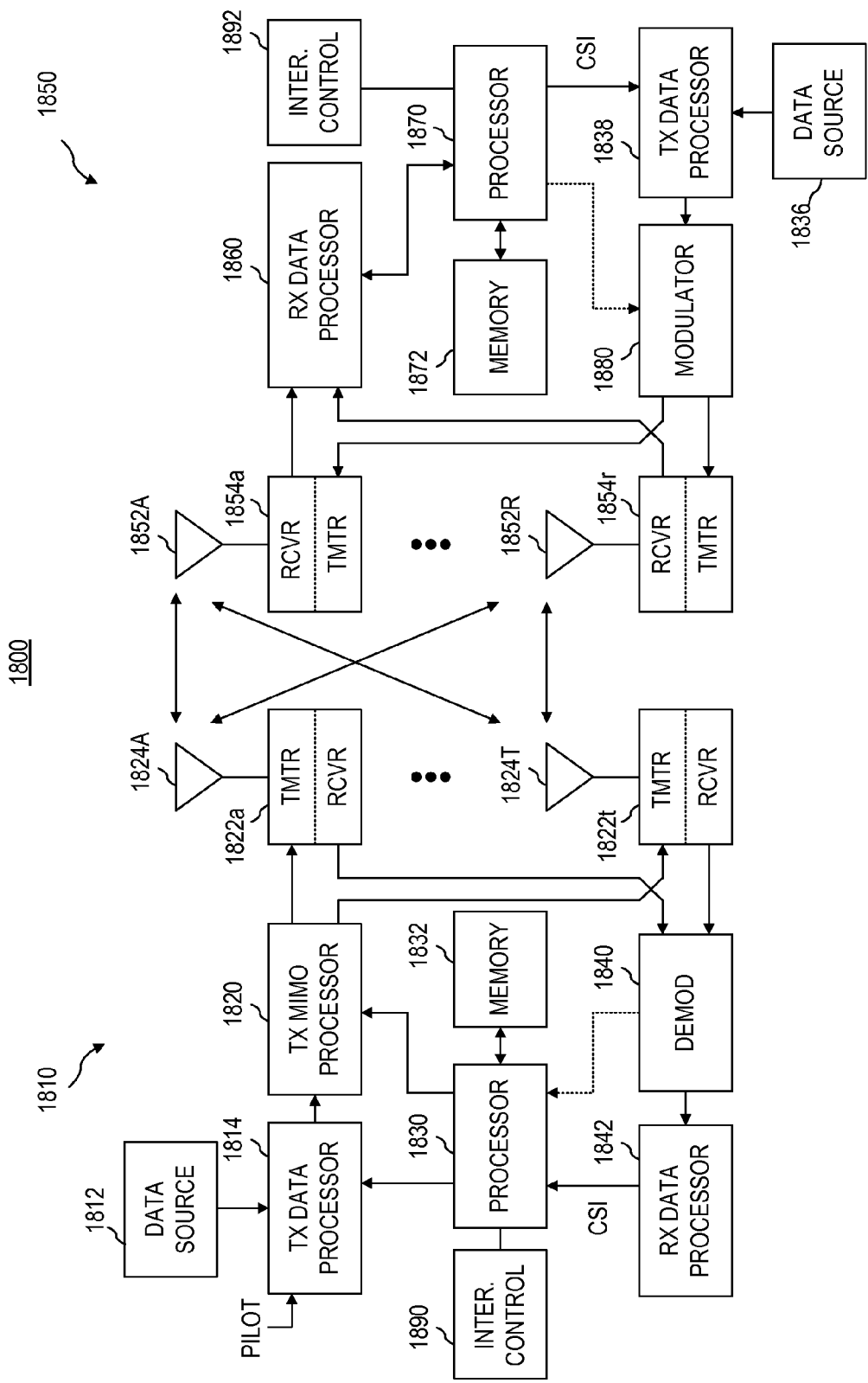
FIG. 18 is a schematic diagram of a multiple input multiple output (MIMO) communication system.

The teachings herein may be incorporated into a node (e.g., a device) employing various components for communicating with at least one other node. FIG. 18 depicts several sample components that may be employed to facilitate communication between nodes. Specifically, FIG. 18 illustrates a wireless device 1810 (e.g., an access point) and a wireless device 1850 (e.g., an access terminal) of a MIMO system 1800. At the device 1810, traffic data for a number of data streams is provided from a data source 1812 to a transmit ("TX") data processor 1814.

In some aspects, each data stream is transmitted over a respective transmit antenna. The TX data processor 1814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1830. A data memory 1832 may store program code, data, and other information used by the processor 1830 or other components of the device 1810.

The modulation symbols for all data streams are then provided to a TX MIMO processor 1820, which may further process the modulation symbols (e.g., for OFDM). The TX MIMO processor 1820 then provides $N_T$ modulation symbol streams to $N_T$ transceivers ("XCVR") 1822a through 1822t that each has a transmitter (TMTR) and receiver (RCVR). In some aspects, the TX MIMO processor 1820 applies beam-forming weights to the symbols of the data streams and to the antenna from which the symbol is being transmitted.

Each transceiver 1822a-1822t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1822a through 1822t are then transmitted from $N_T$ antennas 1824a through 1824t, respectively.

At the device 1850, the transmitted modulated signals are received by $N_R$ antennas 1852a through 1852r and the received signal from each antenna 1852a-1852r is provided to a respective transceiver ("XCVR") 1854a through 1854r. Each transceiver 1854a-1854r conditions (e.g., filters, amplifies, and downconverts) a respective received signal, digitizes the conditioned signal to provide samples, and further processes the samples to provide a corresponding "received" symbol stream.

A receive ("RX") data processor 1860 then receives and processes the $N_R$ received symbol streams from $N_R$ transceivers 1854a-1854r based on a particular receiver processing technique to provide $N_T$ "detected" symbol streams. The RX data processor 1860 then demodulates, deinterleaves, and decodes each detected symbol stream to recover the traffic data for the data stream. The processing by the RX data processor 1860 is complementary to that performed by the TX MIMO processor 1820 and the TX data processor 1814 at the device 1810.

A processor 1870 periodically determines which pre-coding matrix to use. The processor 1870 formulates a reverse link message comprising a matrix index portion and a rank value portion. A data memory 1872 may store program code, data, and other information used by the processor 1870 or other components of the device 1850.

The reverse link message may comprise various types of information regarding the communication link and/or the received data stream. The reverse link message is then processed by a TX data processor 1838, which also receives traffic data for a number of data streams from a data source 1836, modulated by a modulator 1880, conditioned by the transceivers 1854a through 1854r, and transmitted back to the device 1810.

At the device 1810, the modulated signals from the device 1850 are received by the antennas 1824a-1824t, conditioned by the transceivers 1822a-1822t, demodulated by a demodulator ("DEMOD") 1840, and processed by a RX data processor 1842 to extract the reverse link message transmitted by the device 1850. The processor 1830 then determines which precoding matrix to use for determining the beam-forming weights then processes the extracted message.

FIG. 18 also illustrates that the communication components may include one or more components that perform interference control operations. For example, an interference ("INTER.") control component 1890 may cooperate with the processor 1830 and/or other components of the device 1810 to send/receive signals to/from another device (e.g., device 1850). Similarly, an interference control component 1892 may cooperate with the processor 1870 and/or other components of the device 1850 to send/receive signals to/from another device (e.g., device 1810). It should be appreciated that for each device 1810 and 1850 the functionality of two or more of the described components may be provided by a single component. For example, a single processing component may provide the functionality of the interference control component 1890 and the processor 1830 and a single processing component may provide the functionality of the interference control component 1892 and the processor 1870.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for consolidated delivery of one-to-many packets from a local access network by a femto node, comprising:
providing a cellular air-interface service within a coverage area;
communicating with an access terminal;
receiving a plurality of one-to-many packets from a host via a local area network;
buffering the plurality of one-to-many packets during a consolidation period; and
delivering the plurality of one-to-many packets to the access terminal during a cellular communication after the consolidation period.

2. The method of claim 1, further comprising:
wherein the delivering further comprises communicating with the access terminal via the cellular air-interface service; and
supporting a local Internet protocol access by delivering the plurality of one-to-many packets.

3. The method of claim 1, further comprising:
wherein the delivering further comprises communicating with a mobile operator network via a data packet communication channel; and
supporting a remote Internet protocol access by delivering the plurality of one-to-many packets.

4. The method of claim 1, wherein the access terminal comprises a first access terminal, and further comprising assigning a first plurality of action times to the first access terminal separated respectively by a first consolidation period.

5. The method of claim 4, further comprising:
communicating with a second access terminal that arrives in the coverage area at the femto node; and
assigning a second plurality of action times to the second access terminal separated respectively by a second consolidation period;
wherein the second plurality of action times are staggered from the first plurality of action times.

6. The method of claim 1, further comprising:
determining the consolidation period based upon a count of the plurality of one-to-many packets exceeding a threshold; and
paging the access terminal to initiate a cellular connection.

7. The method of claim 1, wherein buffering the plurality of one-to-many packets further comprises storing a plurality of time stamped entries.

8. The method of claim 7, further comprising:
updating the plurality of time stamped entries by storing a source identifier, an arrival time stamp and a packet content for a first entry that arrives during a current consolidation period; and
purging a packet content for a second entry that arrived during a previous consolidation period.

9. The method of claim 1, further comprising:
identifying a duplicate one-to-many packet by determining if more than one of the plurality of one-to-many packets sent from an identical source address with an identical packet content was received during a current consolidation period; and
updating a time stamp for a single entry for the duplicate one-to-many packet to a most recent arriving duplicate one-to-many packet.

10. The method of claim 1, further comprising:
determining whether a one-to-many packet is a unique one-to-many packet by comparing respective source addresses and packet contents for a plurality of one-to-many packets tracked over a period longer than the consolidation period; and
paging the access terminal to initiate a cellular connection and transmitting the one-to-many packet without waiting for an action time for each unique one-to-many packet.

11. The method of claim 1, further comprising reducing a dormancy timer in response to determining that paging of the access terminal is for the plurality of one-to-many packets.

12. The method of claim 11, wherein the reducing further comprises reducing the dormancy timer to zero for immediately terminating a cellular connection after transmitting the plurality of one-to-many packets.

13. The method of claim 1, further comprising increasing a dormancy timer to a default value in response to a unicast packet received from or transmitted to the access terminal during a cellular connection.

14. The method of claim 1, wherein the buffering further comprises discarding a one-to-many packet from the plurality of one-to-many packets in response to determining that the access terminal lacks an application corresponding to the one-to-many packet.

15. The method of claim 1, wherein the delivering further comprises delivering during a cellular connection.

16. The method of claim 1, wherein the delivering further comprises transmitting via a broadcast air-interface or a multicast air-interface.

17. The method of claim 16, wherein the delivering further comprises transmitting via a Broadcast-Multicast System (BCMCS) air-interface.

18. The method of claim 16, wherein the delivering further comprises transmitting via a Multimedia Broadcast Multicast Service (MBMS) air-interface.

19. The method of claim 16, further comprising scheduling the access terminal to receive the plurality of one-to-many packets via the broadcast air-interface or the multicast air-interface in a time slot adjacent to another time slot scheduled for the access terminal to receive overhead information.

20. The method of claim 19, wherein the scheduling further comprises scheduling a transmission to immediately follow a separate transmission of a synchronous capsule in High Rate Packet Data (HRPD).

21. The method of claim 16, wherein the transmitting further comprises transmitting at a multiple number of control channel cycles.

22. The method of claim 16, wherein the transmitting further comprises performing data over signaling via a control channel.

23. The method of claim 22, wherein the transmitting further comprises transmitting a control channel message with unicast addressing.

24. The method of claim 22, wherein the transmitting further comprises transmitting a control channel message with multicast or broadcast addressing.

25. At least one processor for consolidated delivery of one-to-many packets from a local access network by a femto node, comprising:
  a first module for providing a cellular air-interface service within a coverage area;
  a second module for communicating with an access terminal;
  a third module for receiving a plurality of one-to-many packets from a host via a local area network;
  a fourth module for buffering the plurality of one-to-many packets during a consolidation period; and
  a fifth module for delivering the plurality of one-to-many packets to the access terminal during a cellular communication.

26. A computer program product for consolidated delivery of one-to-many packets from a local access network by a femto node, comprising:
  a non-transitory computer-readable storage medium comprising:
    a first set of codes for causing a computer to provide a cellular air-interface service within a coverage area;
    a second set of codes for causing the computer to communicate with an access terminal;
    a third set of codes for causing the computer to receive a plurality of one-to-many packets from a host via a local area network;
    a fourth set of codes for causing the computer to buffer the plurality of one-to-many packets during a consolidation period; and
    a fifth set of codes for causing the computer to deliver the plurality of one-to-many packets to the access terminal during a cellular communication.

27. An apparatus for consolidated delivery of one-to-many packets from a local access network by a femto node, comprising:
  means for providing a cellular air-interface service within a coverage area;
  means for communicating with an access terminal;
  means for receiving a plurality of one-to-many packets from a host via a local area network;
  means for buffering the plurality of one-to-many packets during a consolidation period; and
  means for delivering the plurality of one-to-many packets to the access terminal during a cellular communication.

28. An apparatus for consolidated delivery of one-to-many packets from a local access network by a femto node, comprising:
  a femto base station for providing a cellular air-interface service within a coverage area and for communicating with an access terminal;
  a local area network interface for receiving a plurality of one-to-many packets from a host via a local area network; and
  a computing platform for buffering the plurality of one-to-many packets during a consolidation period; and
  wherein the femto base station is further for delivering the plurality of one-to-many packets to the access terminal during a cellular communication.

29. The apparatus of claim 28, wherein the femto base station is further for communicating with the access terminal that camps on the cellular air-interface service and for supporting a local Internet protocol access by delivering the plurality of one-to-many packets.

30. The apparatus of claim 28, further comprising a remote network interface for communicating with a mobile operator network via a data packet communication channel and for supporting a remote Internet protocol access by delivering the plurality of one-to-many packets, wherein the access terminal accesses the mobile operator network via a cellular air-interface remote to the coverage area of the femto node.

31. The apparatus of claim 28, wherein the computing platform is further for assigning a first plurality of action times to the access terminal separated respectively by a consolidation period.

32. The apparatus of claim 31, wherein the computing platform is further for communicating with a second access terminal that arrives in the coverage area at the femto node, and for assigning a second plurality of action times to the second access terminal separated respectively by a second consolidation period,
  wherein the second plurality of action times are staggered from the first plurality of action times.

33. The apparatus of claim 28, wherein the computing platform is further for determining the consolidation period based upon a count of the plurality of one-to-many packets exceeding a threshold, and the femto base station is further for paging the access terminal to initiate a cellular connection.

34. The apparatus of claim 28, wherein the computing platform is further for buffering the plurality of one-to-many packets by storing a plurality of time stamped entries.

35. The apparatus of claim 34, wherein the computing platform is further for updating the plurality of time stamped entries by storing a source identifier, an arrival time stamp and a packet content for a first entry that arrives during a current consolidation period, and for purging a packet content for a second entry that arrived during a previous consolidation period.

36. The apparatus of claim 28, wherein the computing platform is further for performing a duplicate detection to determine if more than one of the plurality of one-to-many packets sent from an identical source address with an identical packet content was received during a current consolidation period, and for updating a time stamp for a single time entry to a most recent arriving one-to-many packet.

37. The apparatus of claim 28, wherein the computing platform is further for determining whether a one-to-many packet is unique by comparing source addresses and packet contents for a plurality of one-to-many packets tracked over a period longer than the consolidation period, and for paging the access terminal to initiate a cellular connection and transmitting the one-to-many packet without waiting for an action time.

38. The apparatus of claim 28, wherein the computing platform is further for reducing a dormancy timer in response to determining that paging of the access terminal is for the plurality of one-to-many packets.

39. The apparatus of claim 38, wherein the computing platform is further for reducing the dormancy timer to zero for immediately terminating a cellular connection after transmitting the plurality of one-to-many packets.

40. The apparatus of claim 38, wherein the computing platform is further for increasing the dormancy timer to a default value in response to a unicast packet received from or transmitted to the access terminal during a cellular connection.

41. The apparatus of claim 28, wherein the computing platform is further for discarding a one-to-many packet from the local area network without delivering in response to determining that the access terminal lacks a corresponding application.

42. The apparatus of claim 28, further comprising delivering the plurality of one-to-many packets during a cellular connection.

43. The apparatus of claim 28, further comprising a transmitter of the femto base station for delivering the plurality of one-to-many packets by cellular communication by transmitting via a broadcast or multicast air-interface.

44. The apparatus of claim 43, further comprising a transmitter of the femto base station for transmitting the plurality of one-to-many packets via a Broadcast-Multicast System (BCMCS) air-interface.

45. The apparatus of claim 43, further comprising a transmitter of the femto base station for transmitting the plurality of one-to-many packets via a Multimedia Broadcast Multicast Service (MBMS) air-interface.

46. The apparatus of claim 43, wherein the computing platform is further for scheduling the access terminal to receive the plurality of one-to-many packets via the broadcast or multicast air-interface in a time slot adjacent to another time slot scheduled for the access terminal to receive overhead information.

47. The apparatus of claim 46, wherein the computing platform is further for scheduling a transmission of the plurality of one-to-many packets to immediately following transmission of a synchronous capsule in High Rate Packet Data (HRPD).

48. The apparatus of claim 43, wherein the transmitter is further for transmitting the plurality of one-to-many packets at a multiple number of control channel cycles.

49. The apparatus of claim 43, wherein the transmitter is further for transmitting the plurality of one-to-many packets using data over signaling via a control channel.

50. The apparatus of claim 49, wherein the transmitter is further for transmitting a control channel message with unicast addressing.

51. The apparatus of claim 49, wherein the transmitter is further for transmitting a control channel message with multicast or broadcast addressing.

* * * * *